(12) United States Patent
Kamei

(10) Patent No.: US 7,460,259 B2  
(45) Date of Patent: Dec. 2, 2008

(54) PRINT CONTROL DEVICE AND PRINT CONTROL METHOD

(75) Inventor: Tatsuo Kamei, Suita (JP)

(73) Assignee: Panasonic Corporation, Osaka (JP)

( * ) Notice: Subject to any disclaimer, the term of this patent is extended or adjusted under 35 U.S.C. 154(b) by 646 days.

(21) Appl. No.: 10/529,768

(22) PCT Filed: Dec. 17, 2003

(86) PCT No.: PCT/JP03/16147

§ 371 (c)(1),  
(2), (4) Date: Mar. 30, 2005

(87) PCT Pub. No.: WO2004/057456

PCT Pub. Date: Aug. 7, 2004

(65) Prior Publication Data

US 2006/0245803 A1    Nov. 2, 2006

(51) Int. Cl.  
G06F 3/12 (2006.01)  
G06K 15/00 (2006.01)

(52) U.S. Cl. .............. 358/1.15; 358/1.16; 358/1.13

(58) Field of Classification Search .......... 358/1.15, 358/1.16, 1.17, 1.18, 1.13, 1.14, 1.1, 1.2, 358/1.6, 1.9, 404, 444, 407, 468; 347/2, 347/3, 5, 14; 399/1, 8; 715/764, 274, 273, 715/275; 345/156

See application file for complete search history.

(56) References Cited

U.S. PATENT DOCUMENTS

2002/0054109 A1 *  5/2002  Ogino et al. ............. 345/764

FOREIGN PATENT DOCUMENTS

| JP | 5-027929 | 2/1993 |
| JP | 9-240070 | 9/1997 |
| JP | 11-191041 | 7/1999 |
| JP | 2001-256007 | 9/2001 |
| JP | 2002-149371 | 5/2002 |

* cited by examiner

*Primary Examiner*—Dov Popovici  
(74) *Attorney, Agent, or Firm*—Wenderoth, Lind & Ponack, L.L.P.

(57) ABSTRACT

A print control apparatus which makes a search of print data easy includes a storage unit, a display unit, and a control unit that adds attribute information to the print data. The print control apparatus; generates an attributed print job, writes it into the storage unit, arranges and displays, based on an operation by a user, each job name of the attributed print data stored in the storage unit in an order according to the attribute information included in the attributed print data.

26 Claims, 20 Drawing Sheets

FIG. 14

List Data dt21

| Job Number (C1) | Readout Times (C2) | Job Name (C3) |
|---|---|---|
| 1 | 2 | BBA |
| 2 | 1 | AAA |
| 3 | 3 | CCA |
| 4 | 2 | AAB |
| 5 | 4 | BBB |
| 6 | 5 | AAC |
| 7 | 1 | AAD |
| 8 | 3 | BBC |
| 9 | 1 | DDA |

⇕

Attribute Ordered List Data dt22

| Job Number (C4) | Readout Times (C5) | Job Name (C6) |
|---|---|---|
| 6 | 5 | AAC |
| 5 | 4 | BBB |
| 3 | 3 | CCA |
| 8 | 3 | BBC |
| 1 | 2 | BBA |
| 4 | 2 | AAB |
| 2 | 1 | AAA |
| 7 | 1 | AAD |
| 9 | 1 | DDA |

FIG. 16

| Job Number | Readout Order | Job Name |
|---|---|---|
| 1 | 18 | BBA |
| 2 | 5 | AAA |
| 3 | 19 | CCA |
| 4 | 22 | AAB |
| 5 | 21 | BBB |
| 6 | 17 | AAC |
| 7 | 9 | AAD |
| 8 | 20 | BBC |
| 9 | 12 | DDA |

List Data dt31

| Job Number | Readout Order | Job Name |
|---|---|---|
| 4 | 22 | AAB |
| 5 | 21 | BBB |
| 8 | 20 | BBC |
| 3 | 19 | CCA |
| 1 | 18 | BBA |
| 6 | 17 | AAC |
| 9 | 12 | DDA |
| 7 | 9 | AAD |
| 2 | 5 | AAA |

Attribute Ordered List Data dt32

PRINT CONTROL DEVICE AND PRINT CONTROL METHOD

TECHNICAL FIELD

The present invention relates to a print control apparatus included in, for example, a printer and especially to a print control apparatus that stores print data obtained from a host computer and executes printing using the print data without obtaining the print data again.

BACKGROUND ART

In general, a printer includes a printer engine that performs printing based on print data and a print control apparatus that controls the printer engine. (To be precise, controllers other than above mentioned are also included.)

Also, a print control apparatus having a large capacity memory has been conventionally proposed (e.g. refer to Japanese Laid-Open Patent application No. 05-27929, Japanese Laid-Open Patent application No. 09-240070 and Japanese Laid-Open Patent application No. 11-191041).

A print control apparatus having a large capacity memory as described obtains, from an outside host computer and the like, print data indicating sentences and figures to be printed, and stores the print data in the large capacity memory, while it allows a printer engine to execute printing by which contents indicated by the print data are printed.

The print control apparatus can hereby reprint the print contents such as sentences and figures that have been printed in advance, using the print data stored in the large capacity memory. In other words, when a user reprints the previously printed contents, the user does not need an operation of transmitting, from a host computer to the printer, the print data that indicates the print contents. Therefore, the printer can easily perform printing in a short time.

Here, the conventional print control apparatus includes, besides the large capacity memory, a display unit for displaying operation contents, setting contents and the like, an operation unit having an operation button used by a user and a control unit for controlling the display unit and the large capacity memory.

The control unit allows the display unit to display job names indicating each print data stored in the large capacity memory in a list format. If the user operates the operation unit and selects a desired job name from the list displayed on the display unit when such list is displayed, the operation unit notifies the control unit of the selected job name. Note that the job name is a print processing name for the print data.

The control unit then reads out the print data corresponding to the notified job name from the large capacity memory and allows the printer engine to print the print contents indicated in the print data.

Additionally, the display area in the print control apparatus, in general, is relatively small and the number of letters displayed is limited, so that it cannot display a whole list of job names if the amount of held print data is large. In that case, a method for displaying job names in sequence according to an operation by a scroll button and the like in the operation unit is used to solve the problem. Also, the display unit displays the list by each part according only to a predetermined order. That is, the control unit assigns a number to each print data for managing the each print data stored in a large capacity memory and allows the display unit to display the list in an order according to the management numbers.

However, in the conventional print control apparatus, the list of job names is displayed to the display unit according to the order for managing each print data. Therefore, in the case where a large amount of print data is stored in the large capacity memory, it takes time for a user to find a desired job name in the list. In other words, it takes time for the user to find the desired print data among the print data stored in the large capacity memory so that there is a problem of unusability.

Accordingly, the present invention is available to solve the above mentioned problem and it is an object of the present invention to provide a print control apparatus and a print control method with increased convenience by making retrieval of stored print data easy and fast.

DISCLOSURE OF INVENTION

In order to achieve the above objective, the print control apparatus that controls a printer engine which prints data contents based on print data indicating the contents to be printed, comprising: a data generation unit operable to i) obtain the print data from outside the print control apparatus and ii) generate print data with an attribute by adding, to the print data, attribute information indicating the attribute of the print data; a storage unit having a region for storing the print data with the attribute; a writing unit operable to write, into the storage unit, the print data with the attribute generated by the data generation unit; an arrangement display unit operable to arrange and display, based on an operation by a user, each print processing name of a plurality of print data with the attribute stored in the storage unit in an order according to the attribute information included in each of the plurality of print data with the attribute; and a print execution unit operable to allow the user to select one of the print processing names displayed on the arrangement display unit, and cause the printer engine to execute printing based on the print data corresponding to the selected print processing name. For example, the data generation unit i) generates attribute information using, as an attribute of the print data, an order in which the print data with the attribute generated from the print data is written into the storage unit by the writing unit, and ii) adds the generated attribute information to the print data.

Accordingly, each of the plurality of print data is stored as the print data with attribute which the attribute is attached and displayed by arranging a print processing name for said each print data with the attribute in an order according to the attribute information. Therefore, the user can easily and quickly find the print data stored in the print control apparatus by the operation and cause the print control apparatus to execute printing based on the print data. As the result, a usability of the print control apparatus can be improved.

Here, the arrangement display unit may further select and display a print processing name corresponding to the attribute information specified by the user among the print processing names arranged in the order according to the attribute information.

Consequently, according to a specification of the attribute information by the user, only the print processing name corresponding to the specified attribute information is displayed so that the user can find the print data stored in the print control apparatus further easily.

Note that, the present invention can be realized as a print control method for the print control apparatus, a program for causing a computer to execute the method, a recording medium which holds the program, and as a print control apparatus including the print control apparatus.

BRIEF DESCRIPTION OF DRAWINGS

FIG. 14 is a data content display diagram indicating contents included respectively in a list data and an attribute ordered list data according to the variation 2 of the above mentioned.

FIG. 16 is a data content display diagram indicating contents included respectively in a list data and an attribute ordered list data according to the variation 3 of the above mentioned.

BEST MODE FOR CARRYING OUT THE INVENTION

Hereafter, a print control apparatus in an embodiment of the present invention is explained with reference to figures.

Figure 1:
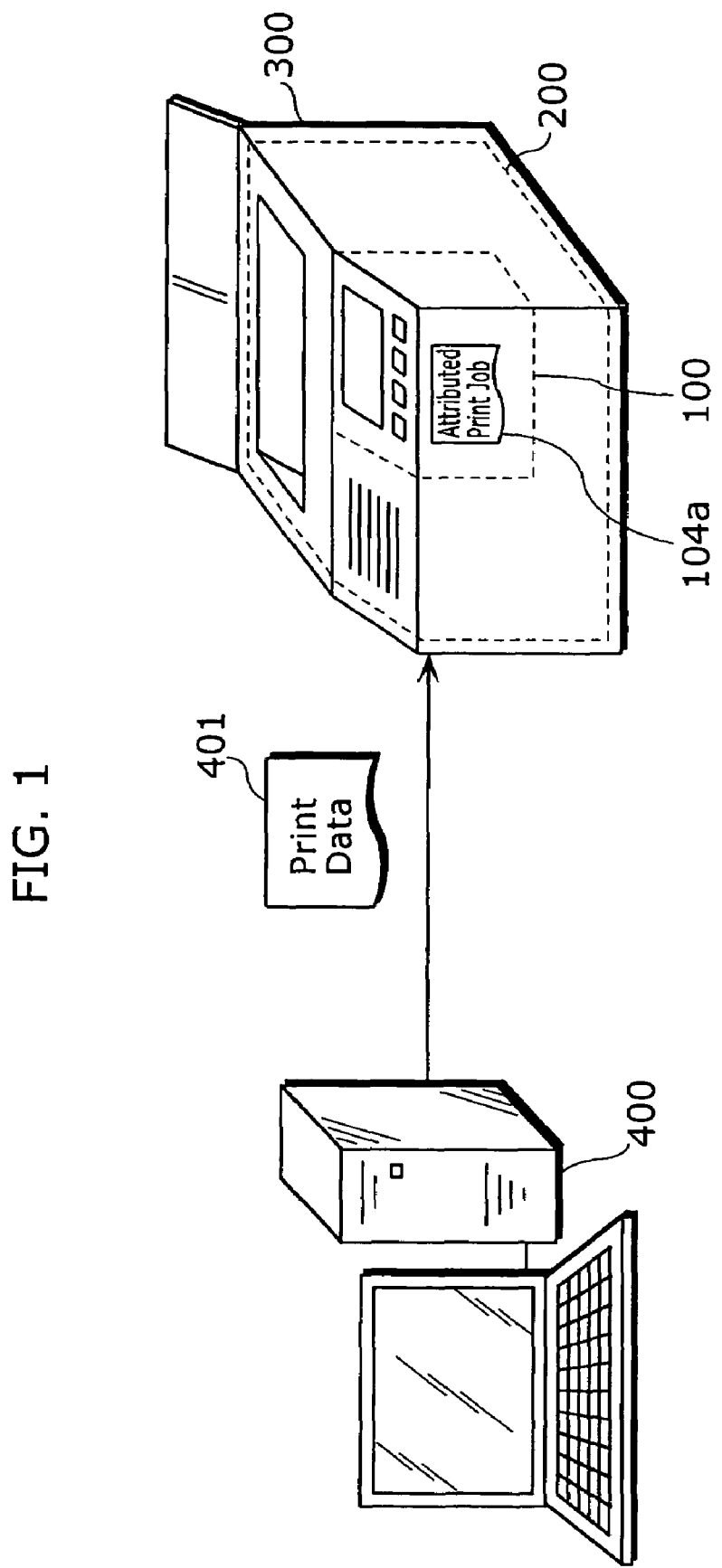
FIG. 1 is a configuration diagram showing a configuration of a print system in embodiments of the present invention.

FIG. 1 is a configuration diagram showing a configuration of a print system according to the embodiment of the present invention.

The printing system includes a host computer 400 which generates and outputs print data 401 indicating print contents such as sentences and figures, and a printer 300 which obtains the print data 401 from the host computer 400 and prints the print contents indicated in the print data 401.

The host computer 400 displays, when it outputs the print data 401 to the printer 300, in advance, a memory inquiry screen for inquiring a user about whether or not the print data 401 should be stored in the printer 300. The host computer 400 then outputs, when it receives an instruction by the user's operation to store the print data 401 into the printer 300, to the printer 300, a memory execution signal indicating the contents of the instruction together with the print data 401.

The printer 300 includes a printer engine 200 to perform printing based on the print data 401 and a print control apparatus 100 to control the printer engine 200.

The printer 300 according to the present embodiment has a so-called memory print function and stores the print data 401 used for printing. Having such memory print function, the printer 300 executes printing in a short time, omitting time required for data transmission and expansion.

The print control apparatus 100 according to the present embodiment, when it receives print data 401 and the memory execution signal from the host computer 400, outputs the print data 401 to the printer engine 200, allows the printer engine 200 to print the print contents in the print data 401 and generates an attributed print job 104a by adding attribute information indicating an attribute of the print data 401 to the print data 401. The print control apparatus 100 then stores the attributed print job 104a so that it can quickly perform printing based on the print data 401 again. Here, the attributed print job 104a is the attributed print data that are the print data 401 to which the attribute information is added.

Additionally, the print control apparatus 100 allows, when it obtains only the print data 401 and doest not obtain the memory execution signal from the host computer 400, the printer engine 200 to execute printing based on the print data 401 without generating and storing the attributed print job 104a.

Figure 2:
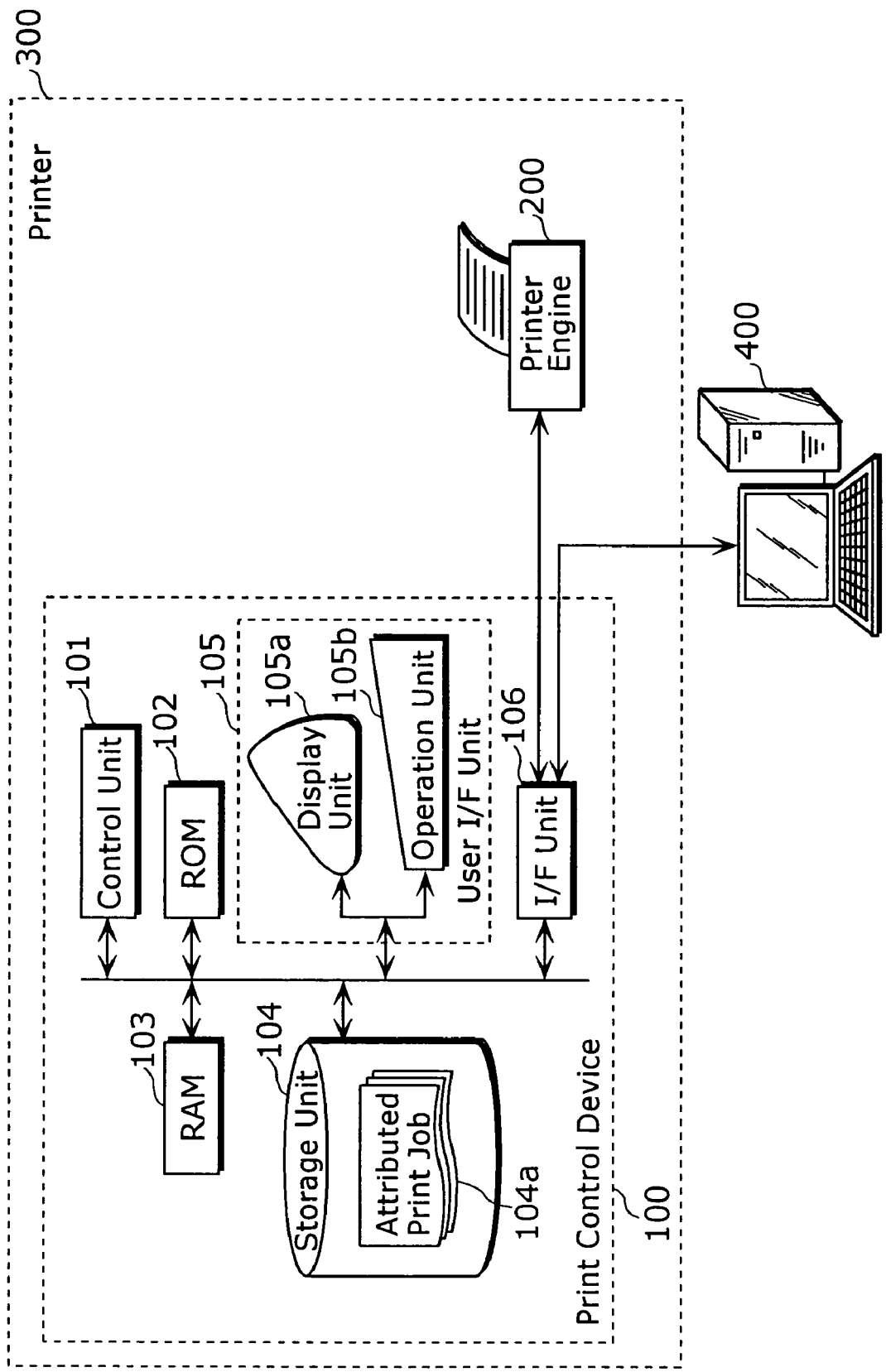
FIG. 2 is a block diagram showing an internal configuration of a printer of the above mentioned.

FIG. 2 is a block diagram showing an internal configuration of the printer 300.

The print control apparatus 100 of the printer 300 includes a control unit 101 composed of a Central Processing Unit (CPU) and the like, a Read Only Memory (ROM) 102 that stores, in advance, a program for print control to be executed by the control unit 101, a Random Access Memory (RAM) 103 where the control unit 101 temporarily records data and reads out the data, a storage unit 104 having an area for storing the attributed print job 104a, a user I/F unit 105 that interfaces between the user and the control unit 101, and an I/F unit 106 that interfaces between an apparatus outside the print control apparatus 100 and the control unit 101.

The user I/F unit 105 has a display unit 105a with, for example, a liquid crystal display screen on which operation contents and setting contents of the printer 300 are displayed, and an operation unit 105*b* with an operation button and the like operated by the user.

The display range of the display unit 105*a* is, for example, horizontally 20 letters and vertically 3 letters. Here, the display range may be horizontally 16 letters or vertically 1 letter or 2 letters and the display unit 105*a* may be configured with a bitmap display. Further, when the number of letters to be displayed on the display unit 105*a* is larger than the display range, these letters are scroll-displayed by an operation of the operation unit 105*b*.

The storage unit 104 is a large capacity memory that can store relatively large capacity of information and is configured with a hard disk drive, a non-volatile semiconductor memory and the like. Note that, the storage unit 105 may be configured with a drive including a DVD, a CD and a MO.

The control unit 101 according to the present embodiment generates an attributed print job 104*a* by adding attribute information to the print data 401 and stores it into the storage unit 104 in response to an instruction from the host computer 400. At the same time, in response to an operation by the operation unit 105*b*, the control unit 101 also allows the display unit 105*a* to display a job name of each print data 401 in an order based on the attribute information and allows the display unit 105*a* to display only the job names corresponding to predetermined attribute information. Here, the job name is a print processing name for the print data 401 and is included previously in the print data 401 outputted from the host computer 400.

First, a processing operation that the control unit 101 generates an attributed print job 104*a* and allows the storage unit 104 to store the attributed print job 104*a* is explained in detail.

The control unit 101 obtains the print data 401 and the memory execution signal from the host computer 400 via the I/F unit 106, then outputs the print data 401 to the printer engine 200 via the I/F unit 106 and allows the printer engine 200 to print based on the print data 401. The control unit 101 also generates the attributed print job 104*a* by adding the attribute information to the print data 401 and stores the generated attributed print job 104*a* into the storage unit 104. Also, when the control unit 101 obtains only the print data 401 and does not obtain the memory execution signal from the host computer 400 via the I/F unit 106, the control unit allows the printer engine 200 to execute only the printing. Further, the control unit 101 assigns a job number to each attributed print job 104*a* to manage each attributed print job 104*a* stored in the storage unit 104.

Here, when generating the attribute information, the control unit 101 considers the order of writing the attributed print job 104*a* generated based on the print data 401 into the storage unit 104 (the writing order) as an attribute of the print data 401 and generates attribute information indicating the writing order.

Figure 3:
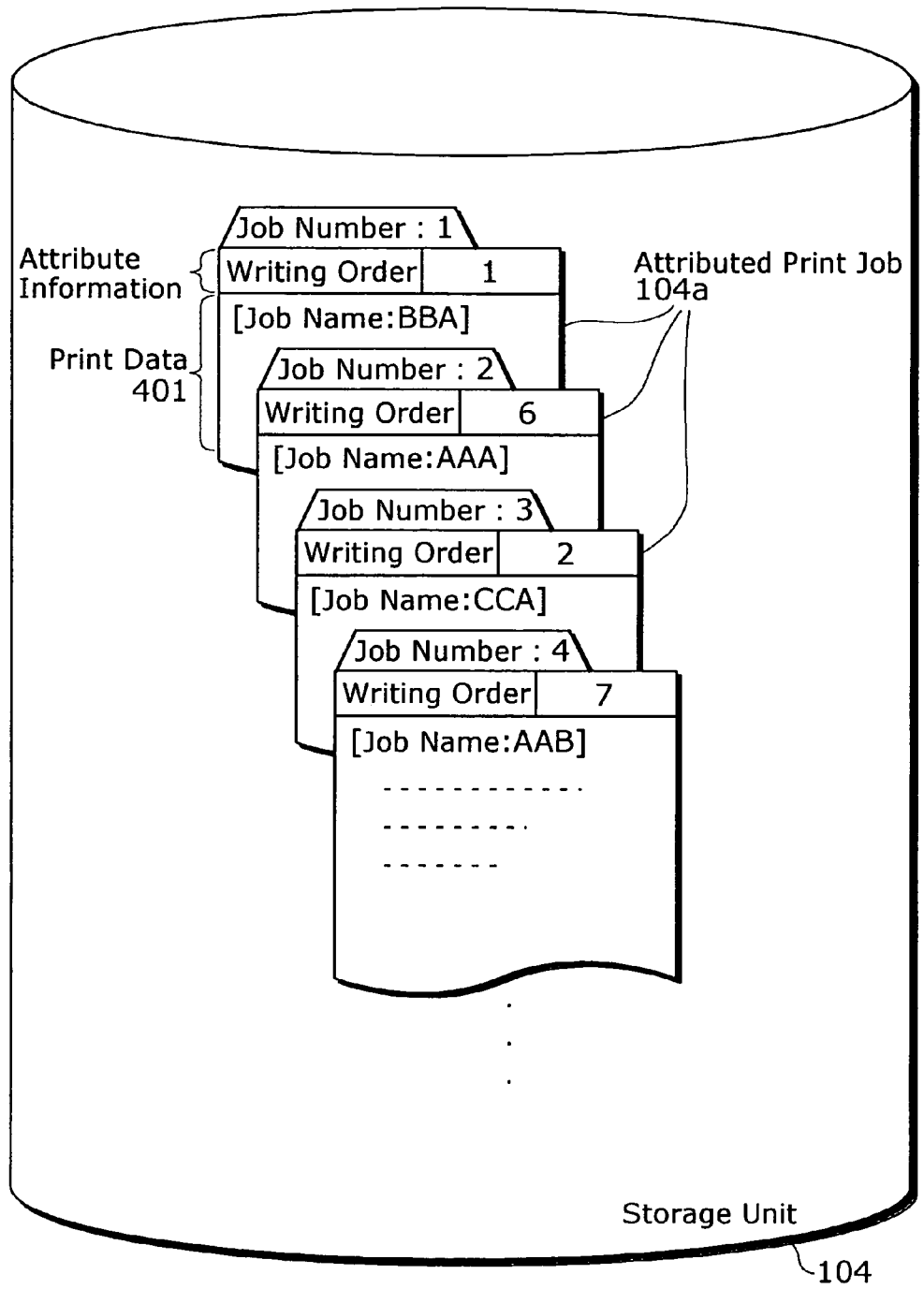
FIG. 3 is a data contents display diagram indicating data contents of an attributed print job stored in a storage unit of the above mentioned.

FIG. 3 is a data contents display diagram showing the attributed print jobs 104*a* stored in the storage unit 104.

An attributed print job 104*a* includes a job number, attribute information and print data 401. For example, the attributed print job 104*a* includes "1" indicating the job number, "1" indicating the writing order as the attribute information and the print data 401 including the job name "BBA".

Figure 4:
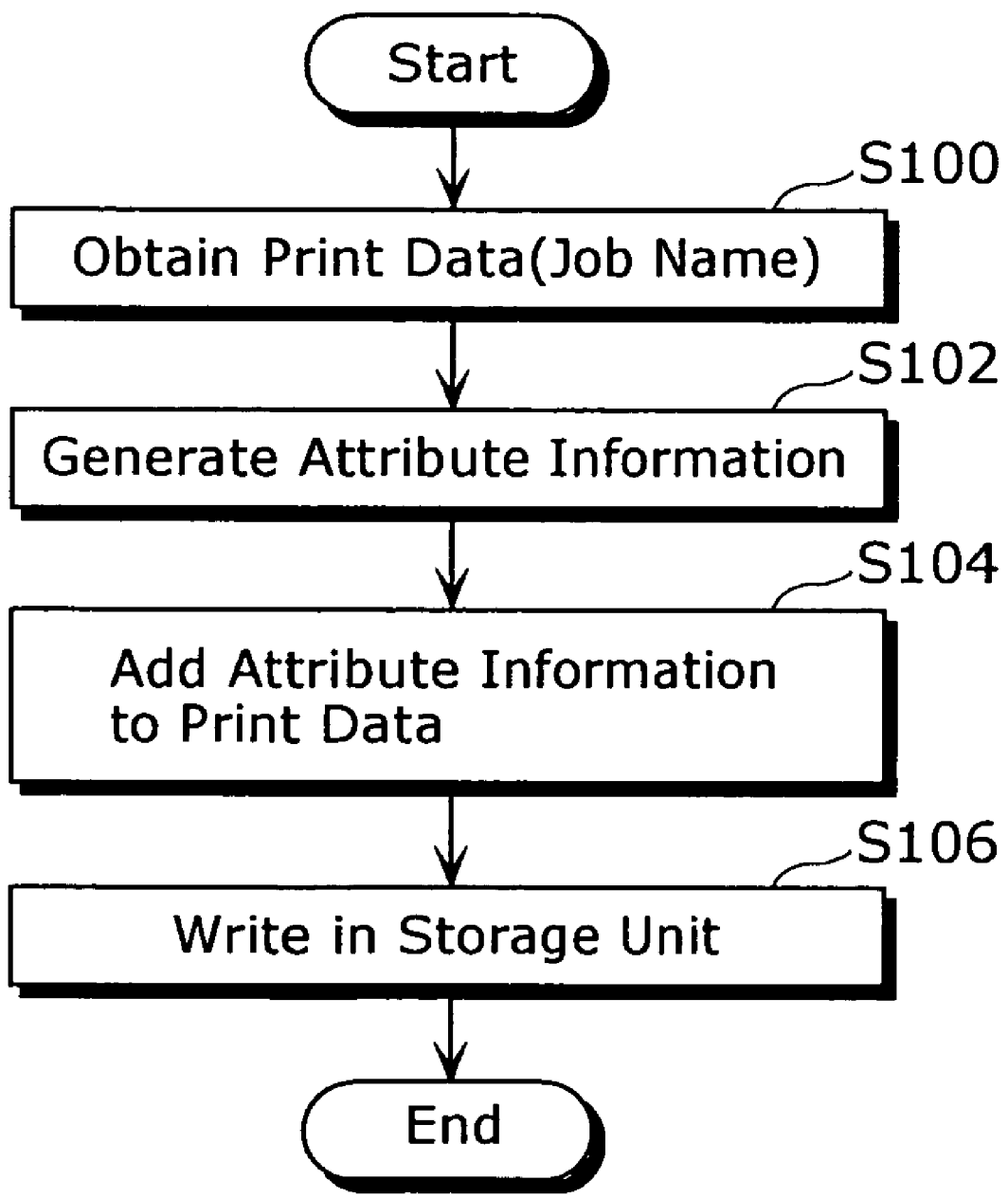
FIG. 4 is a flow chart indicating an operation by a control unit to write the attributed print job into the storage unit of the above mentioned.

FIG. 4 is a flow chart showing the operation by the control unit 101 to write an attributed print job 104*a* into the storage unit 104.

First, the control unit 101 obtains the print data 401 from the host computer 400 via the I/F unit 106 (Step S100). When the control unit 101 that has obtained print data 401 writes the attributed print job 104*a* based on the print data 401 into the storage unit 104, the control unit 101 identifies the writing order and generates the attribute information indicating the identified writing order (Step S102).

Next, the control unit 101 adds the attribute information generated at Step S102 to the obtained print data 401 and generates the attributed print job 104*a* (Step S104). The control unit 101 then writes the generated attributed print job 104*a* into the storage unit 104 (Step S106).

Figure 5:
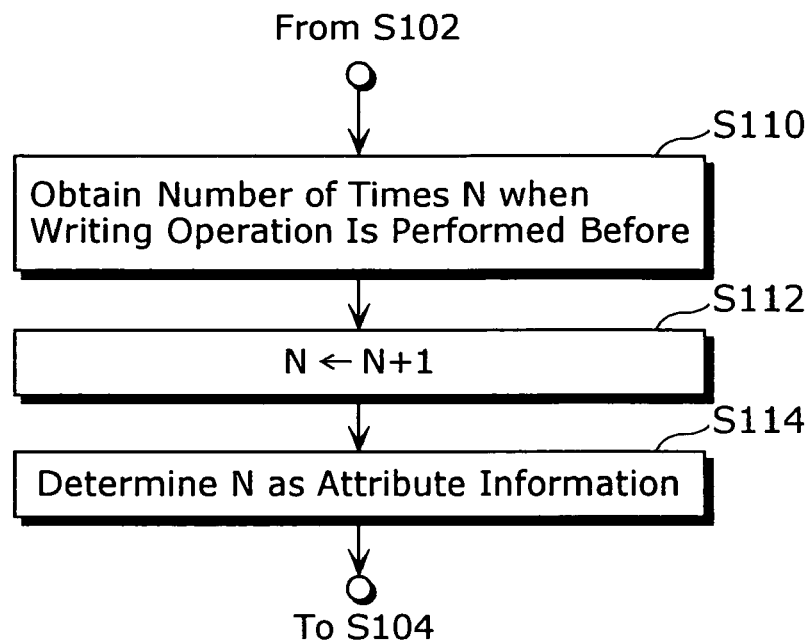
FIG. 5 is a flow chart indicating a detailed operation by the control unit generates attribute information indicating a writing order of the above mentioned.

FIG. 5 is a flow chart showing a detailed operation by the control unit 101 to generate the attribute information indicating the writing order.

First, the control unit 101 obtains the number of times N when the writing operations were performed before, for example, from RAM103 (S110).

Following that, the control unit 101 adds one to the number of obtained times N, updates the number of times N and stores the updated number of times N to RAM103 (Step S112).

Then, the control unit 101 considers the number of times N updated at Step S112 as the above-described writing order and generates the attribute information indicating the writing order (Step S114).

Next, it is explained in detail about a processing operation by the control unit 101 to allow the display unit 105*a* to display job names of the print data 401 stored in the storage unit 10.

The control unit 101 in the present embodiment allows the display unit 105*a* to display the job name of each attributed print job 104*a* stored in the storage unit 104 in the order of the job numbers or allows the display unit 105*a* to display the job name of each attributed print job 104*a* in the writing order, corresponding to a signal from the operation unit 105*b*.

In other words, when-the user operates the operation unit 105*b* to display job names of the print data 401 stored in the printer 300 in a default order, the job names are displayed in the order of the job numbers. Further, when the user operates the operation unit 105*b* to display job names in an order corresponding to the attribute information, namely, in the writing order, the job names are displayed in the writing order.

Figure 6:
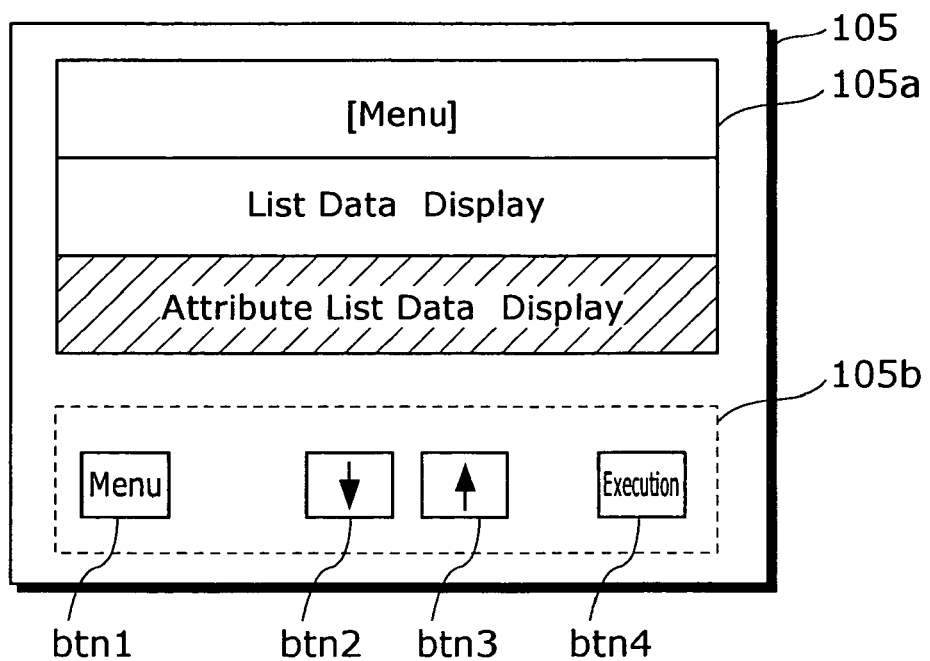
FIG. 6 is an illustration for explaining an operation to a user I/F unit of the printer of the above mentioned.

FIG. 6 is an illustration for explaining an operation to the user I/F unit 105 of the printer 300.

When the user wants to display, on the display unit 105*a*, job names of the print data 401 stored in the printer 300, the user operates a menu button btn1 in the operation unit 105*b*. Hereby, "List Data Display", "List Data in Order of Attribute Display" and the like are displayed as a menu on the display unit 105*a*. Here, when the user tries to display the job names of the print data 401 in the default order, the user operates arrow buttons of btn2 and btn3 to reverse-display "List Data Display" and operates the execution button btn4 in the state. Consequently, the job names are displayed in ascending order of the job numbers. Also, when the user tries to display the job names of the print data 401 in the writing order, the user operates the arrow buttons of btn2 and btn3 to reverse-display "List Data in Order of Attribute Display" and operates the execution button btn4 in the state. Thereby, the job names are displayed in the writing order on the display unit 105*a*.

Specifically, when the execution button btn4 is operated in the state that "List Data Display" is reverse-displayed, the operation unit 105*b* outputs, to the control unit 101, a list display instruction signal that instructs to display a list of the job names of each attributed print job 104*a* stored in the storage unit 104 in the order of job numbers. Also, when the execution button btn4 is operated in the sate that "List Data in Order of Attribute Display" is reverse-displayed, the operation unit 105*b* outputs, to the control unit 101, an attribution order instruction signal that instructs to display the list of job names of each attributed print job 104a stored in the storage unit 104 in the writing order.

The control unit 101 obtains a list display instruction signal from the operation unit 105b and generates list data indicating a list of job names arranged in ascending order of job numbers. That is, the control unit 101 reads out the job number, the writing order that is the contents of the attribute information and the job name from each attributed print job 104a stored in the storage unit 104. Then, the control unit 101 generates the list data by arranging, in ascending order of the job numbers, the job number, the writing order and the job name for each readout attributed print job 104a. The control unit 101, which has generated-the list data, outputs the list data to the display unit 105a and allows the display unit 105a to display each job name in order of the arrangement.

Further, the control unit 101 generates attribute ordered list data indicating a list of job names arranged in the writing order when it receives the attribution order instruction signal from the operation unit 105b. That is, the control unit 101 obtains the attribution signal and reads out the job number, the writing order that is the contents of the attribute information and the job name from each attributed print job 104a. Then, the control unit 101 generates the attribute ordered list data by arranging, in the writing order, the job number, the writing order and the job name for each readout attributed print job 104a. The control unit 101, which has generated list data in order of the attribution, outputs the attribution ordered list data to the display unit 105a and allows the display unit 105a to display each job name arranged in the order of the arrangement.

Figure 7:
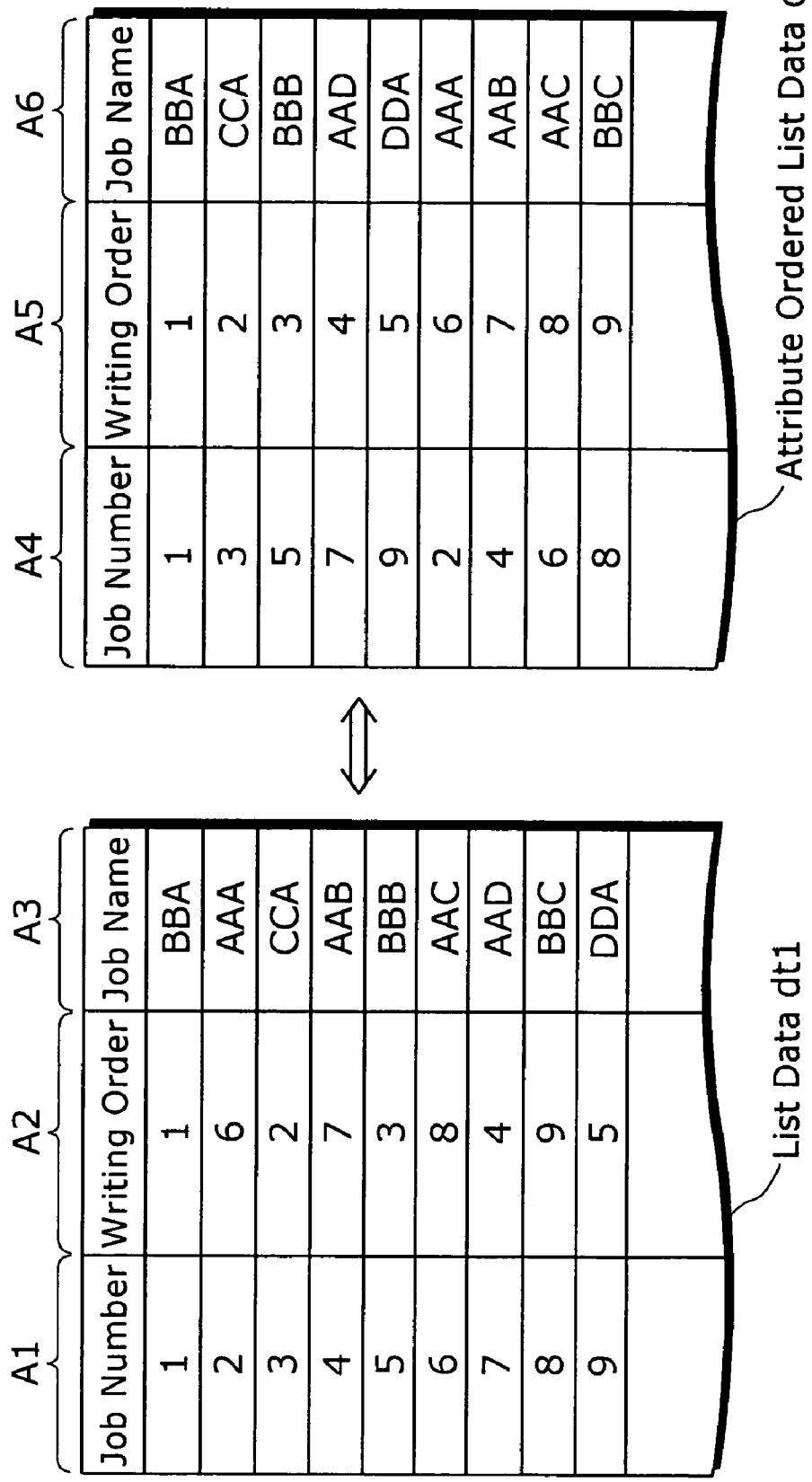
FIG. 7 is a data contents display diagram indicating contents included respectively in a list data and an attributed ordered list data of the above mentioned.

FIG. 7 is a data content display diagram indicating contents included respectively in the list data and the attribution ordered list data.

The list data dt1 has a job number column A1 in which job numbers are stored, a writing order column A2 in which a writing orders are stored and a job name column A3 in which job names are stored.

The control unit 101 stores the job numbers readout from the storage unit 104 into the job number column A1 by arranging in ascending order from the top. At the same time, it stores, into the writing column A2, the writing order that is the attribute information readout from the storage unit 104 by associating with the corresponding job number. Also, it stores, in the job name column A3, the job name readout from the storage unit 104 by associating with the corresponding job number.

The attribution ordered list data dt2 has, similar to the list data dt1, a job number column A4 in which job numbers are stored, a writing order column A5 in which the writing order are stored and a job name column A6 in which job names are stored.

The control unit 101 arranges, in writing order, a set of a job number, a writing order that is attribute information and a job name for each attributed print job 104a readout from the storage unit 104. Then, in order of the arrangement, the control unit 101 stores each job number into the job number column A4, each writing order into the writing order column A5 and each job name into the job name column A6.

Figure 8:
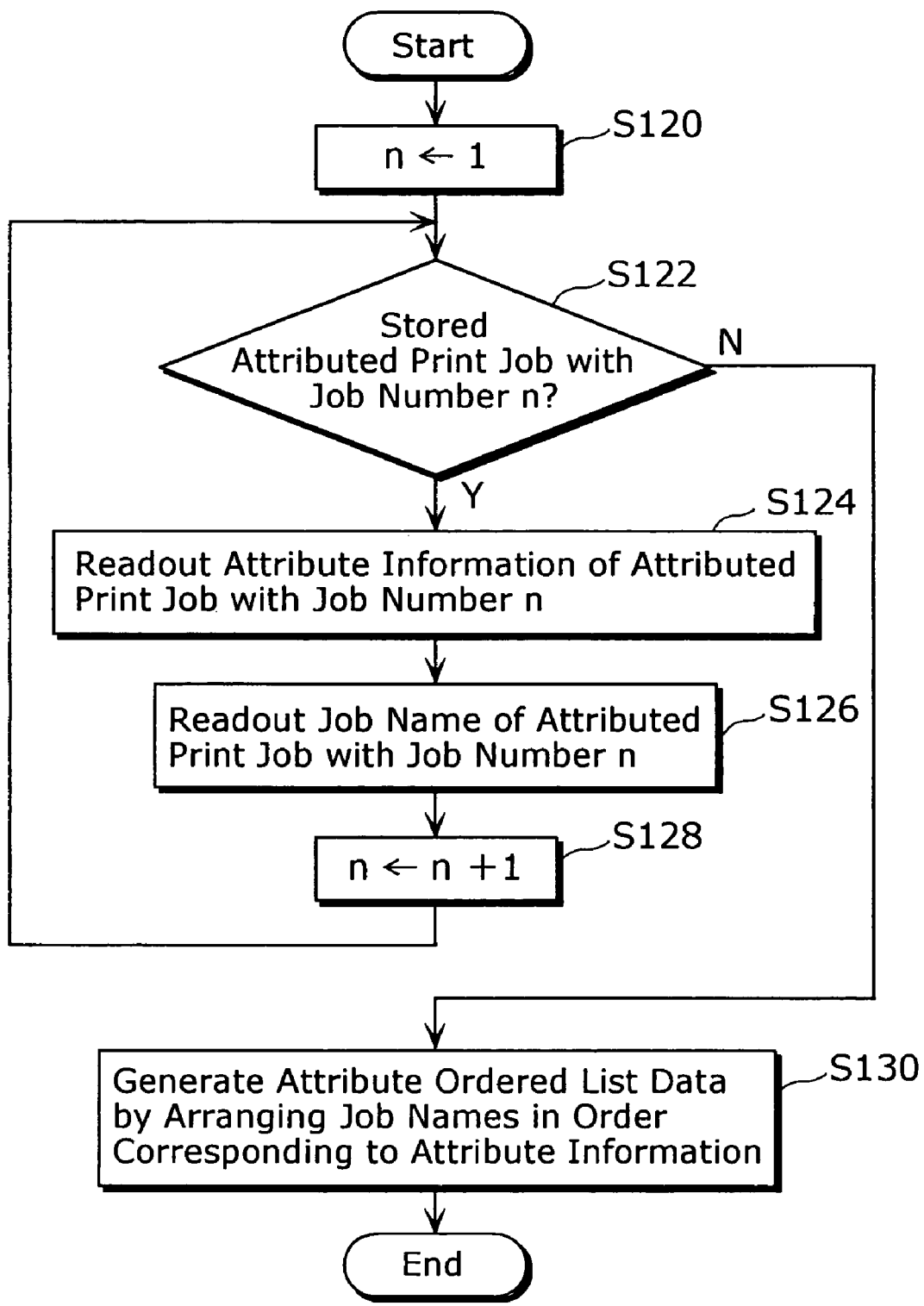
FIG. 8 is a flow chart indicating an operation by the control unit to generate the attribute ordered list data of the above mentioned.

FIG. 8 is a flow chart showing an operation by the control unit 101 to generate the attribute ordered list data dt2.

First, the control unit 101 initializes a count number n of an inside counter to 1 (Step S120) and judges whether or not an attributed print job 104a including the job number equal to the count number n is stored in the storage unit 104 (Step S122).

Here, when the control unit 101 judges that the attributed print job 104a is stored in the storage unit 104 (Y at Step S122), the control unit 101 reads out the writing order that is the attribute information from the attributed print job 104a (Step S124). Further, the control unit 101 reads out the job name from the attributed print job 104a (Step S126).

Next, the control unit 101 adds 1 to the count number n of the inside counter and updates it (Step S128) and repeats the operations from Step S122.

In addition, when the control unit 101 judges that the attributed print job 104a is not stored in the storage unit 104 (N at Step S122), it generates the attribute ordered list data dt2 by arranging, in ascending order of the writing order, a set of i) the writing order that is the attribute information of the attributed print job 104a readout at Step 124, ii) the job name readout at Step 126 and iii) the job number (Step S130).

Figure 9:
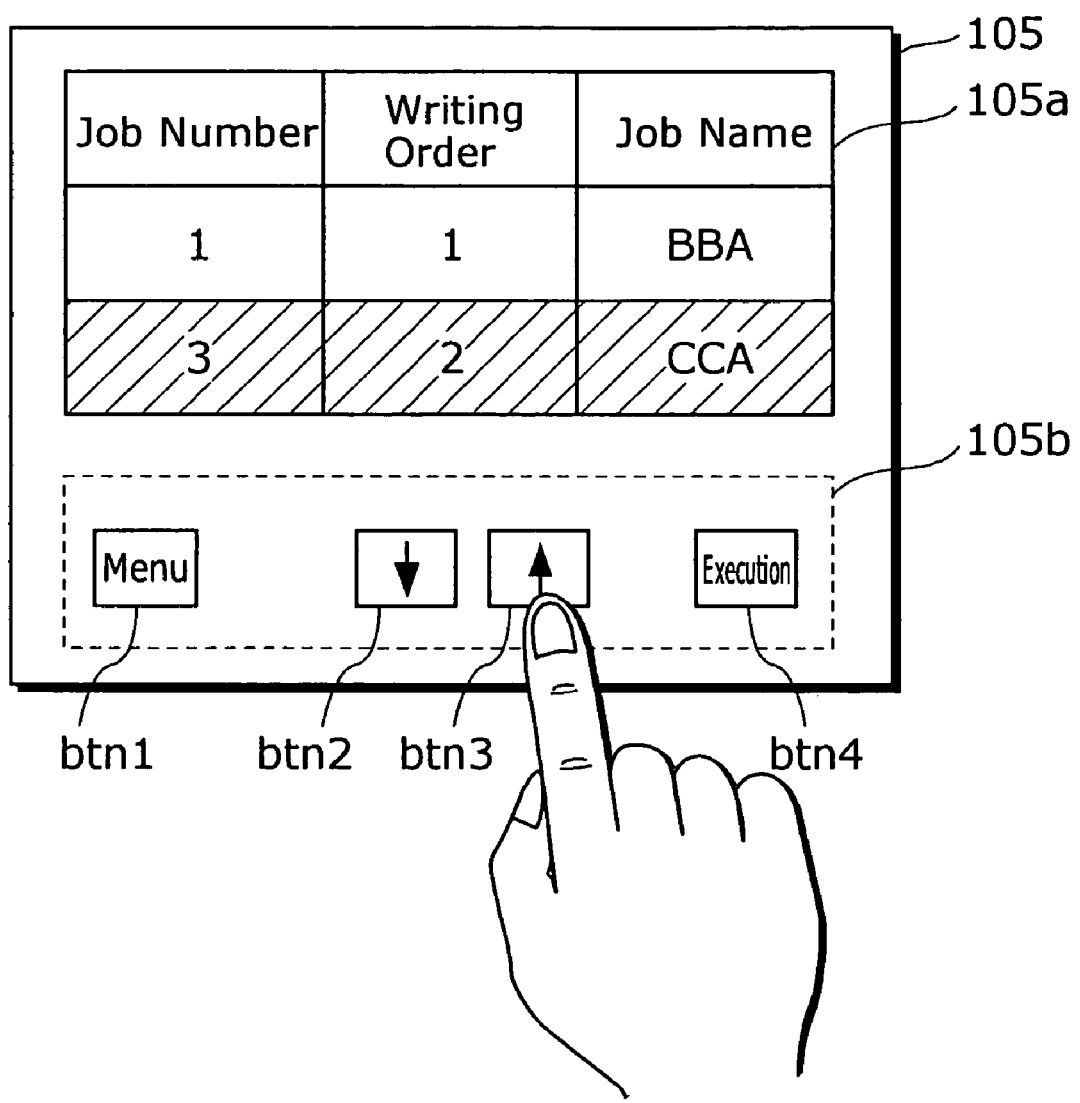
FIG. 9 is a screen example diagram showing an example of a screen displayed to a display unit of the user I/F unit of the above mentioned.

FIG. 9 is a screen example diagram showing an example of a screen displayed on the display unit 105a of the user I/F unit 105.

The display unit 105a obtains the attribute ordered list data dt2 from the control unit 101 and displays job numbers, writing orders and job names stored in the attribute ordered list data dt2 in sequence from the top. Here, even if the display range of the display unit 105a is small and all the sets of a job number, a writing order and a job name stored in the attribute ordered list data dt2 are not displayed at once, the display unit 105a can display all by scrolling each set stored in the attribute ordered list data dt2 in an arrangement order corresponding to a signal from the operation unit 105a based on operations by the arrow buttons of btn2 and btn3.

Here, when the user has a writing order "2" and a job name "CCA", for example, reverse-displayed by pushing down the arrow buttons of btn 2 and btn 3 and pushes down the execution button btn4 of the operation unit 105b, the control unit 101, responding to the output signal from the operation unit 105b, searches the attributed print job 104a having the writing order "2" and the job name "CCA" in the storage unit 104.

When the control unit 101 finds the attributed print job 104a, it then reads out the print data 401 included therein and outputs the readout print data 401 to the printer engine 200 via the I/F unit 106 and allows the printer engine 200 to print the print contents included in the print data 401.

As is described, in the present embodiment, the job names of all print data 401 stored in the storage unit 104 are displayed on the display unit 105a not only by being arranged in an order set to the default but also by being arranged in the writing order in response to an operation from a user. Therefore, the user can easily find the print data 401 stored in the printer 300 by looking at the display unit 105a and allows the printer 300 to execute the printing rapidly based on the print data 401. In other words, in the present embodiment, the job names are displayed in order according to user's expectations so that the operability can be remarkably improved.

For example, when the user tries to execute printing based on the print data 401 with a job name "AAD", if the user displays the screen shown in FIG. 6 on the display unit 105a and selects "List Data Display", the list data dtn1 shown in FIG. 7 is generated by the control unit 101 and job names are displayed on the display unit 105a in order of job numbers. Therefore, the user has to push down the arrow button dtn2 five times to find the job name "AAD". However, when the user displays the screen shown in FIG. 6 on the display unit 105a and selects "Attribute Ordered List Data Display", the attribute ordered list data dtn2 shown in FIG. 7 is generated by the control unit 101 and the job names are displayed in the writing order on the display unit 105a. Consequently, the user can push down the arrow button dtn2 only twice to find the job name "AAD". As a result, the printer 300 can execute the printing quickly based on the print data 401 with the job name "AAD".

Next, it explains about a processing operation for displaying, on the display unit 105*a*, job names of the print data 401 stored in the storage unit 104 by limiting to those corresponding to predetermined attribute information.

If the menu button btn1 of the operation unit 105*b* is operated while the display unit 105*a* is displaying a list of job names shown in FIG. 9, the control unit 101, based on the output signal from the operation unit 105*b*, displays, on the display unit 105*a*, a search refinement inquiry screen which inquires about whether or not search refinement for displaying the attribute ordered list data dt2 is performed. Then, when the user inputs an instruction to execute the search refinement to the operation unit 105*b*, the control unit 101 allows the display unit 105*a* to display only the job names corresponding to a predetermined writing order.

Figure 10:
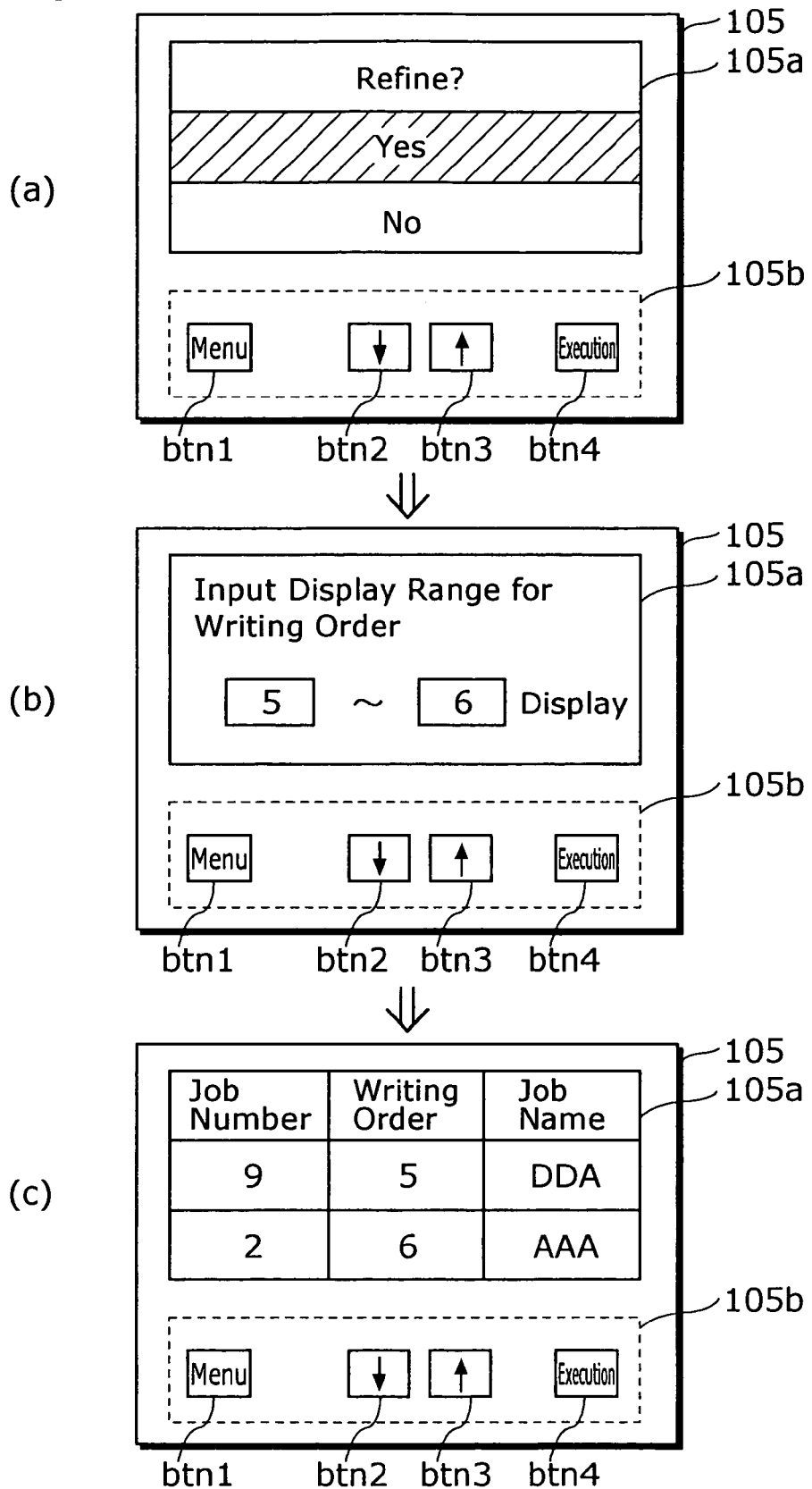
FIG. 10 is an illustration for explaining screen displays of the display unit of the above mentioned when a refinement is performed.

FIG. 10 is an illustration for explaining screen displays of the display unit 101*a* when the search refinement is performed.

First, based on the output signal from the operation unit 105*b*, the control unit 101 displays the refinement inquiry screen as shown in FIG. 10(*a*). Here, the user operates the arrow buttons btn2 and btn3 to reverse-display "Yes" and the control unit 101 displays, as shown in FIG. 10(*b*), an input screen for inputting a range of the writing order on the display unit 105*a* by operating the execution button btn4. Herein, the user inputs contents to instruct to display the job names corresponding to "5~6" in the writing order by operating the arrow buttons btn2 and btn3 of the operation unit 105*b* and, by operating the execution button btn4, the control unit 101 displays the job names corresponding to the above-mentioned writing order as shown in FIG. 10(*c*). Additionally, the control unit 101 herein displays the job names in the writing order so as to display the job name with the writing order "5" earlier than the job name with the writing order "6".

As is described, in the present embodiment, since job names of the print data 401 stored in the storage unit 104 are displayed by limiting to those corresponding to the writing order specified by a user, the user can find the print data 401 stored in the printer 300 more easily by looking at the display unit 105*a* and allows the printer 300 to execute quickly the printing based on the print data 401.

(Variation 1)

Here, the variation 1 concerning attribute information is explained.

The control unit 101 according to the present variation determines the number of required pages (number of pages) in the case where the printer engine 200 executes the printing based on the print data 401 as an attribute of the print data 401.

Figure 11:
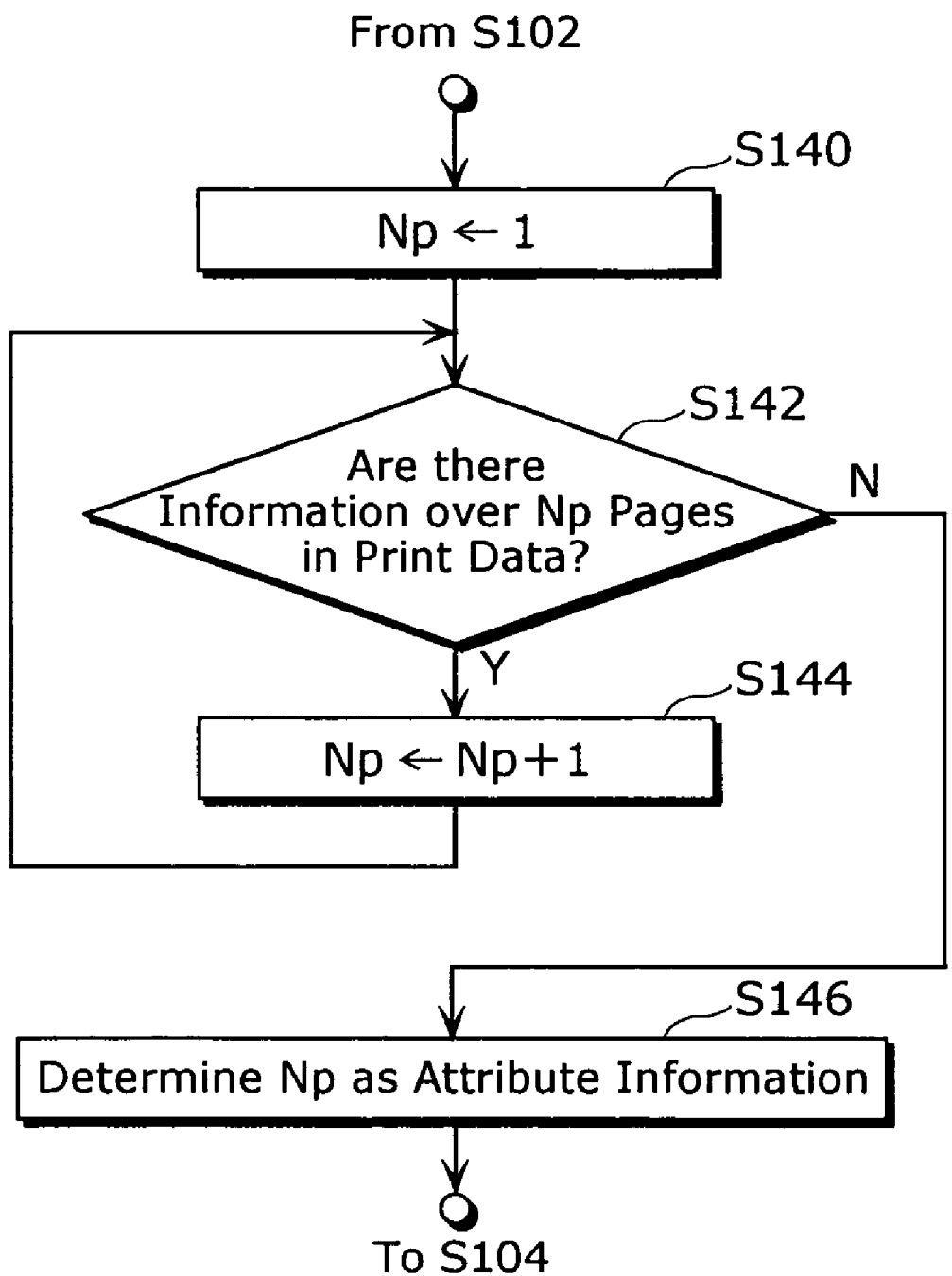
FIG. 11 is a flow chart indicating a detailed operation by the control unit 101 to generate attribute information indicating the number of pages according to a variation 1 of the above mentioned.

That is, in a generation of the attribute information at Step S102 shown in FIG. 4, the control unit 101 executes a procedure of generating the attribute information with the number of pages shown in FIG. 11 instead of executing a procedure generating the attribute information in the writing order shown in FIG. 5.

FIG. 11 is a flowchart showing a detailed operation by the control unit 101 that generates attribute information indicating the page number.

First, the control unit 101 starts obtaining the print data 401 and initializes a count number Np of a built-in page number counter to 1 (Step S140).

Next, the control unit 101 judges whether or not the number of pages more than the count number Np is required when the printing based on the print data 401 is executed, that is, it judges whether or not there are information in the print data for more than the Np pages (Step S142).

Here, the control unit 101 updates the count number Np by adding 1 to the count number Np (Step S144) when it is judged that there are a number of pages more than the count number Np (Y at Step S142). Also, the control unit 101 generates attribute information with the count number Np as the number of pages (Step S146) when it is judged that there are not as many information as the number of the Np page (N at Step S142).

In the operation process, the control unit 101 specifies the number of pages corresponding to one print data 401 after obtaining all of the print data 401, and generates attribute information indicating the contents of the page number. However, the control unit 101 may generate the attribute information before obtaining all pieces of the print data 401. In other words, the control unit 101 writes attribute information indicating predetermined page numbers into the storage unit 104 when it starts obtaining the print data 401, and it also writes, as obtaining the print data 401 partially, the part in sequence into the storage unit 104 and generates an attributed print job 104*a*. Then, the control unit 101 updates the attribute. Accordingly, the writing operation into the storage unit 104 can be quickly performed.

Also, the control unit 101 in the variation, in response to the signal from the operation unit 105*b*, allows the display unit 105*a* to display a job name of each attributed print job 104*a* stored in the storage unit 104 in order of job numbers, or allows the display unit 105*a* to display the job name of each attributed print job 104*a* in order of page numbers.

In specific, the control unit 101 obtains the list display instruction signal from the operation unit 105*b* and reads out a job number, a page number which is the content of the attribute information, and a job name respectively from each attributed print job 104*a* stored in the storage unit 104. Then, the control unit 101 generates list data by arranging the job number and the job name for each readout attributed print job 104*a* in order of job numbers. The control unit 101 which generated the list data outputs the list data to the display unit 105*a* and allows the display unit 105*a* to display each job name in order of job numbers.

Further, the control unit 101 obtains the attribute ordered instruction signal from the operation unit 105*b* and reads out the job number, the page number which is the content of the attribute information, and the job name respectively from each attributed print job 104*a* stored in the storage unit 104. Then, the control unit 101 generates attribute ordered list data by arranging the job number, the page number and the job name for each readout attributed print job 104*a* in a descending order of page numbers. The control unit 101 which generates the attribute ordered list data outputs the attributed ordered list data to the display unit 105*a* and allows the display unit 105*a* to display each job name in the descending order of the page numbers.

Figure 12:
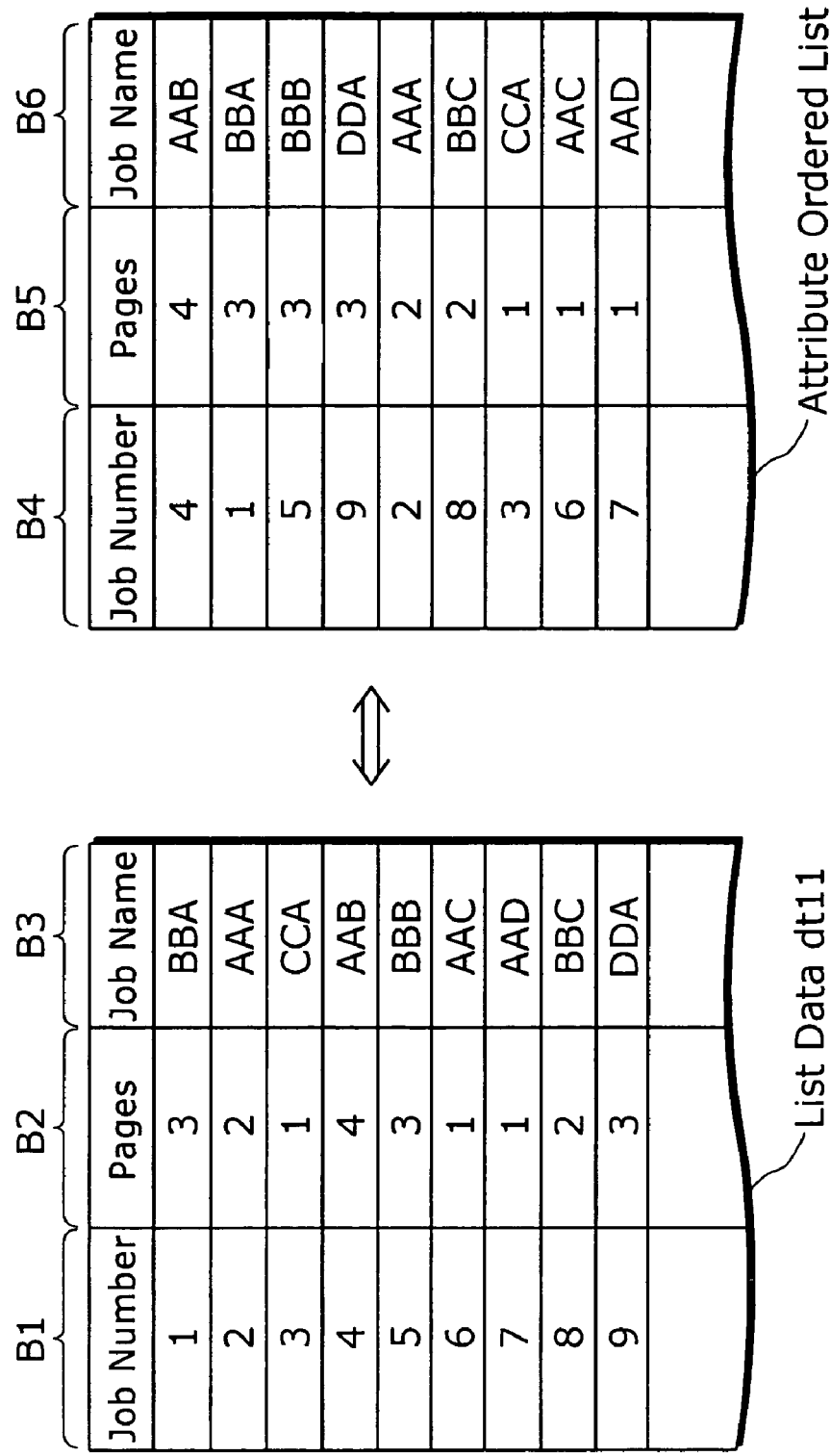
FIG. 12 is a data content display diagram indicating contents included respectively in a list data and an attribute ordered list data according to the variation 1 of the above mentioned.

FIG. 12 is a data content display diagram showing the contents included respectively in the list data of the present variation and in the attribute ordered list data.

A list data dt11 has a job number column B1 in which job numbers are stored, a page number column B2 in which page numbers are stored, and a job name column B3 in which job names are stored.

The control unit 101 i) stores, into the job number column B1, the job numbers readout from the storage unit 104 by arranging them in an ascending order of the job numbers starting from the top, ii) stores, into the page number column B2, the page number, which is the attribute information readout from the storage unit 104, by associating with the corresponding job number, and iii) stores, into the job name column B3, the job name readout from the storage unit 104 by associating with the corresponding job number.

An attribute ordered list data dt12, similar to the list data dt11, has a job number column B4 in which job numbers are stored, a page number column B5 in which page numbers are stored, and a job name column B6 in which job names are stored.

The control unit 101 arranges a set of a job number for each attributed print job 104a readout from the storage unit 104, a page number which is the attribute information and the job name in a descending order of the page numbers. The control unit 101 then stores, in the arrangement order, each job number into the job number column B4, each page number into the page number column B5, and each job name into the job name column B6.

Accordingly, also in the present variation, all of the job names of the print data 401 stored in the storage unit 104 are not only displayed on the display unit 105a by being arranged in an order set by default, but also displayed on the display unit 105a by being displayed in a descending order of the page numbers in response to an operation by a user. Therefore, the user can easily find the print data 401 stored in the printer 300 by looking at the display unit 105a so that the user can cause the printer 300 to execute printing quickly based on the print data 401.

For example, when the user tries to execute printing based on the print data 401 whose job name is "DDA", if the screen shown in FIG. 6 is displayed on the display unit 105a and the "list data display" is selected, the list data dt11 shown in FIG. 12 is generated and job names are displayed, on the display unit 105a, in order of the job numbers. Therefore, the user cannot find the job name "DDA" unless the user pushes an arrow button btn2 of the operation unit 105b seven times. However, if the user selects the "attribute ordered list data display" by allowing the display unit 105a to display the screen shown in FIG. 6, the attribute ordered list data dt12 shown in FIG. 12 is generated by the control unit 101 and the job names are displayed to the display unit 105a in a descending order of the page numbers. Therefore, the user can find the job name "DDA" only by pushing the arrow button btn2 of the operation unit 105b once. Consequently, the printer 300 can quickly execute the printing based on the print data 401 whose job name is "DDA".

Also, the control unit 101 in the present variation, similar to what is explained in FIG. 10, allows the display unit 105a to display job names of the print data 401 stored in the storage unit 104 by limiting only to job names which correspond to a predetermined attribute information. That is, the control unit 101 in the present variation allows the display unit 105a to display only job names corresponding to page numbers inputted to the operation unit 105b. Here, in the case where the page numbers inputted to the operation unit 105b has, for example, a range from 1 to 3 pages and there is a plurality of job names corresponding to the page numbers, the control unit 101 allows it to display the job names in a descending order of the page numbers. Further, in the case where there is a plurality of job names corresponding to the same page number, the control unit 101 allows it to display the job names in an ascending order of the job numbers.

Accordingly, also in the present variation, in response to the operation by the user, the job names of the print data 401 stored in the storage unit 104 are displayed to the display unit 105a by limiting only to the job names which correspond to the page numbers specified by the user. Therefore, the user can more easily find the print data 401 stored in the printer 300 by looking at the display unit 105a and the user can allow the printer 300 to execute quickly a printing based on the print data 401.

(Variation 2)

Here, the variation 2 concerning attribute information is explained.

The control unit 101 in the present variation determines the number of times when the print data 401 is readout from the storage unit 104 of the print data 401 as an attribute.

That is, the control unit 101, in a process of generating attribute information at the step S102 shown in FIG. 4, generates the attribute information whose details indicate that the number of readout times is 0 instead of executing the procedure of generating the attribute information in the order of writing shown in FIG. 5. The control unit 101 then updates, as the print data 401 included in the attributed print job 104a stored in the storage unit 104 is readout, the number of reading out times which is the attribute information including in the attributed print job 104a.

Figure 13:
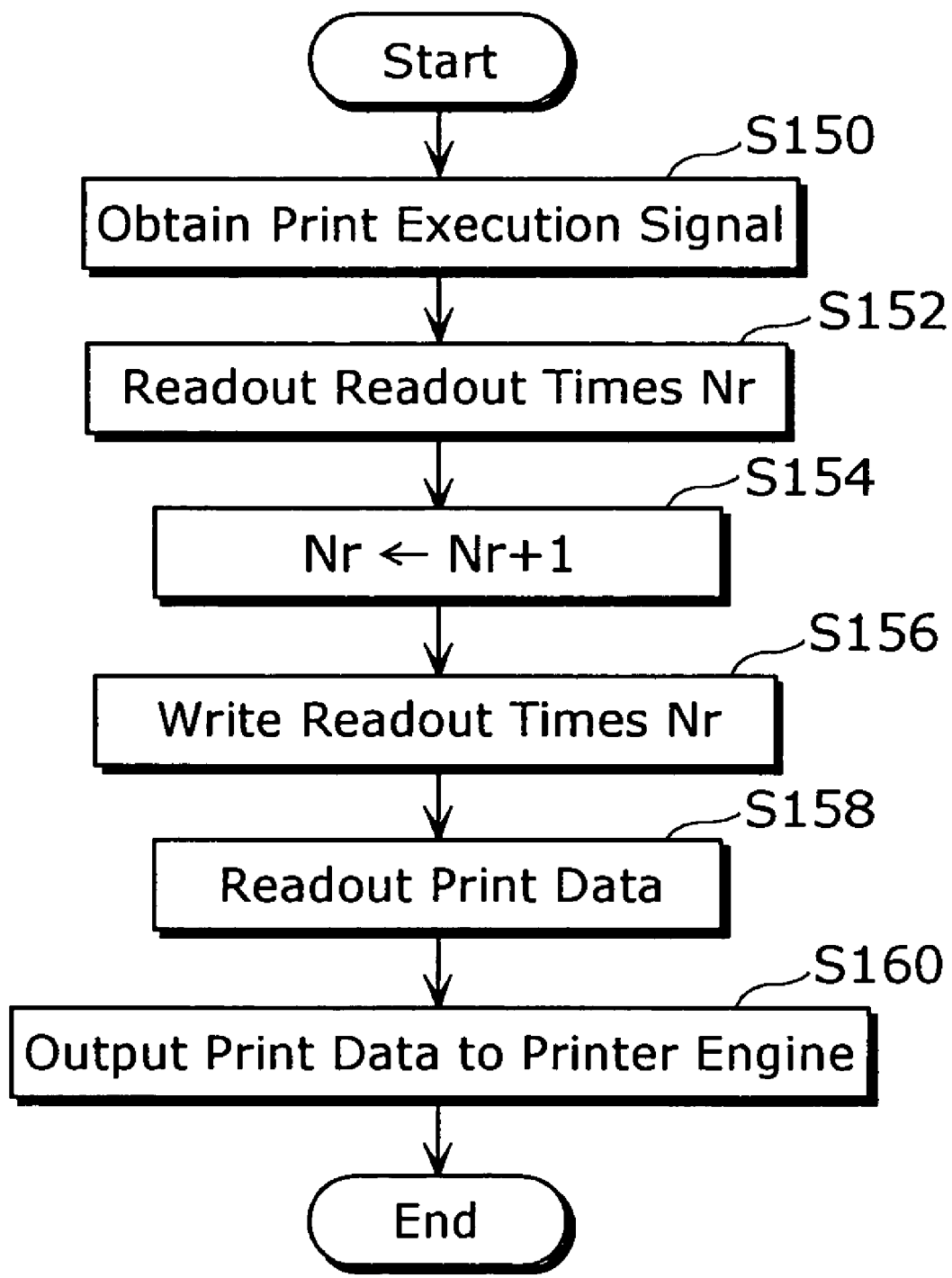
FIG. 13 is a flow chart indicating an operation by the control unit to readout print data according to a variation 2 of the above mentioned.

FIG. 13 is a flowchart indicating the operation by the control unit 101 to readout the print data 401.

When the user operates the operation unit 105b to execute printing based on the print data 401 stored in the printer 300, the operation unit 105b outputs, to the control unit 101, a print execution signal for instructing to execute the printing based on the print data 401.

In here, the control unit 101 obtains the print execution signal (Step S150) and reads out the attribute information of the print data 401 corresponding to the print execution signal, that is, the readout times Nr from the storage unit 104 (Step S152). The control unit 101 then updates the readout times Nr by adding one to the readout times Nr (Step S154), and writes the updated readout times Nr into the attributed print job 104a in the storage unit 104 (Step S156).

After writing the readout times Nr, the control unit 101 reads out the print data 401 (Step S158), outputs the readout data to the printer engine 200 via the I/F unit 106, and allows the printer engine 200 to print the print contents included in the print data 401 (Step S160).

Here, the control unit 101 updates the readout times Nr by adding one at step S154. However, the control unit 101 may update it by adding numbers other than one, or may update by other processes.

Also, the control unit 101 in the present variation, according to a signal outputted from the operation unit 105b, allows the display unit 105a to display the job name of each attributed print job 104a stored in the storage unit 104 in order of the job numbers, and allows the display unit 105a to display the job names of each attributed print job 104a in a descending order of the number of readout times.

In specific, the control unit 101 obtains the list display instruction signal from the operation unit 105b and reads out the job name, the number of readout times which is a content of the attribute information and the job name respectively from each attributed print job 104a stored in the storage unit 104. The control unit 101 then generates a list data by arranging the job number, the readout times and the job name for each attributed readout print job 104a in order of the job numbers. The control unit 101 which has generated the list data outputs the list data to the display unit 105a and allows the display unit 105a to display each job name in the arrangement order.

Further, the control unit 101 obtains the attribute ordered instruction signal from the operation unit 105b and reads out the job number and the readout times that are contents of the attribute information, and the job name respectively from each attributed print job 104a stored in the storage unit 104. The control unit 101 then generates an attribute ordered list data by arranging the job number, the readout times and the job name for each attributed print job 104a in a descending order of the readout times. The control unit 101 which has generated the attribute ordered list data outputs the attribute ordered list data to the display unit 105a and allows the display unit 105a to display each job name in the arrangement order.

FIG. 14 is a data content display diagram showing contents included respectively in the list data and the attribute ordered list data in the present variation.

A list data dt21 has a job number column C1 in which job numbers are stored, a readout times column C2 in which the number of the readout times is stored, and the job name column C3 in which job names are stored.

The control unit 101 i) stores, into the job number column C1, the job numbers readout from the storage unit 104 by arranging in an ascending order starting from the top, ii) stores, into the readout times column C2, the number of readout times which is the attribute information readout from the storage unit 104 by associating with the corresponding job numbers, and iii) stores, into the job name column C3, the job names readout from the storage unit 104 by associating with the corresponding job numbers.

An attribute ordered list data dt22 has, similar to the list data dt21, a job number column C4 in which job numbers are stored, a readout times column C5 in which the number of readout times are stored, and a job name column C6 in which job names are stored.

The control unit 101 arranges a set of a job number for each attributed print job 104a readout from the storage unit 104, the number of readout times which is attribute information, and a job name in a descending order of the number of readout times. The control unit 101 then stores, in the arrangement order, each job number into the job number column C4, each number of readout times into the readout times column C5, and each job name into the job name column C6.

Accordingly, in the present variation, the job names of all pieces of print data 401 stored in the storage unit 104 are displayed, to the display unit 105a, not only by being arranged in a descending order of the readout times but also by being arranged in a descending order of the readout times in response to an operation from a user. Therefore, the user can easily find the print data 401 stored in a printer 300 by looking at the display unit 105a and can cause the printer 300 to quickly execute printing based on the print data 401.

For example, when the user tries to execute printing based on the print data 401 whose job name is "AAC", if the screen shown in FIG. 6 is displayed to the display unit 105a and the "list data display" is selected, the list data dt21 shown in FIG. 14 is generated by the control unit 101, and the job names are displayed, to the display unit 105a, in order of the job numbers. Therefore, the user cannot find the job name "AAC" unless the user pushes the arrow button btn2 of the operation unit 105a four times. However, if the user selects the "attribute ordered list data display" by making the screen shown in FIG. 6 display to the display unit 105a, the attribute ordered list data dt22 shown in FIG. 14 is generated by the control unit 101 and job names are displayed to the display unit 105a in a descending order of the readout times. Therefore, the user can find the job name "AAC" without pushing the arrow button of the operation unit 105b even once. As the result, the printer 300 can quickly execute printing based on the print data 401 whose job name is "AAC".

Also, in the present variation, the control unit 101, similar to what is explained in FIG. 10, allows the display unit 105a to display the job names of the print data 401 stored in the storage unit 104 by limiting only to the job names corresponding to the predetermined attribute information. That is, the control unit 101 in the present variation allows the display unit 105a to display only the job names corresponding to the readout times inputted by a user to the operation unit 105b. Here, in the case where the number of readout times inputted by the operation unit 105b has a range, for example, 2 to 4 times and there is a plurality of job names corresponding to the readout times, the control unit 101 allows the display unit 105a to display the job names in a descending order of the readout times. Further, in the case where there is a plurality of job names which corresponds to the same number of readout times, the control unit 101 allows it to display the job names in an ascending order of the job names.

Thus, in the present variation, according to the operation by the user, the job names of the print data 401 stored in the storage unit 104 are displayed, to the display unit 105a, by limiting only to the job names which corresponds to the readout times designated by the user. Therefore, the user can more easily find the print data 401 stored in the printer 300 by looking at the display unit 105a and can quickly execute printing based on the print data 401 by the printer 300.

(Variation 3)

Here, the variation 3 concerning the attribute information is explained.

The control unit 101 in the present variation determines, as an attribute, an order in which the print data 401 is readout from the storage unit 104 (readout order) of the print data 401.

That is, the control unit 101 generates, in the process of generating attribute information at Step S102 shown in FIG. 4, the attribute information indicating that the readout order is 0, instead of executing the procedure of generating the attribute information in order of the writing shown in FIG. 5. The control unit 101 then updates the readout order which is the attribute information included in an attributed print job 104a every time when the print data 401 included in the attributed print job 104a stored in the storage unit 104 is read out.

Figure 15:
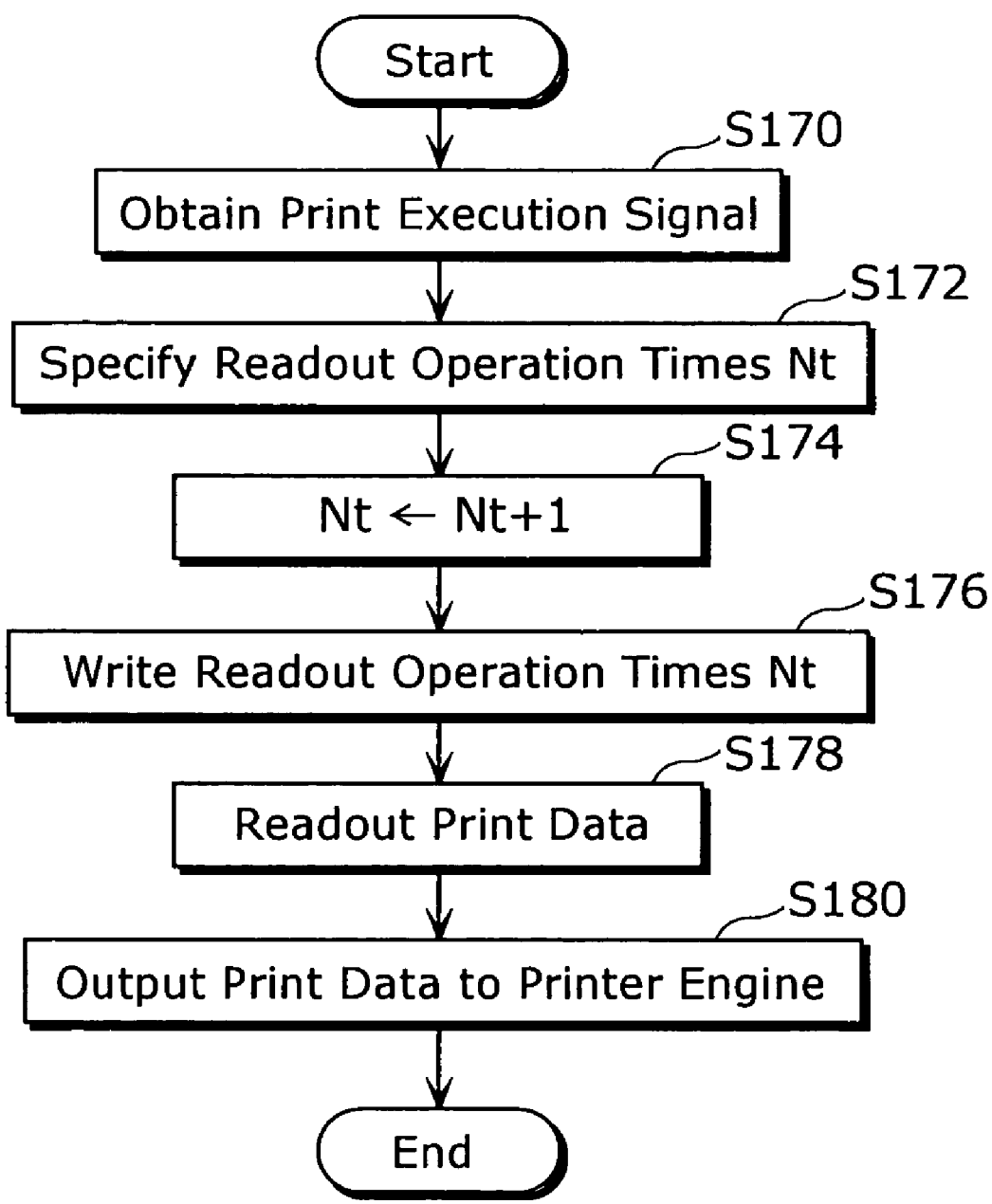
FIG. 15 is a flow chart indicating an operation by the control unit to readout print data according to a variation 3 of the above mentioned.

FIG. 15 is a flowchart indicating an operation for the control unit 101 to readout the print data 401.

When a user operates the operation unit 105b to execute printing based on the print data 401 stored in the printer 300, the operation unit 105b outputs, to the control unit 101, a print execution signal for instructing to execute printing based on the print data 401.

Here, the control unit 101 obtains the print execution signal (Step S170) and specifies readout operation times Nt of the print data from the storage unit 104 which has been counted by then (Step S172). The control unit 101 then updates the readout operation times Nt by adding, in advance, one to the specified readout operation times Nt (Step S174), and writes over the attribute information of the attributed print job 104a of the storage unit 104 (Step S176) by defining the updated readout operation times Nt as the readout order of the print data 401.

After writing over the readout times (the readout operation times) Nt, the control unit 101 actually i) reads out the print data 401 (Step S178), ii) outputs the readout print data to the printer engine 200 via the I/F unit 106, and iii) allows the printer engine 200 to print the print contents included in the print data 401 (Step S180).

By the way, the control unit 101 updates the readout operation times Nt by adding one at Step S174. However, it may updates the readout operation times by adding a number other than one or by using other processes.

Also, the control unit 101 in the present variation, according to a signal from the operation unit 105b, allows the display unit 105a to display job names of each print job 104a stored in the storage unit 104 in an order of the job numbers and allows the display unit 105a to display job names of each attributed print job 104a in a reserve order of the readout order.

In specific, the control unit 101 obtains the list display signal from the operation unit 105b and reads out the job number, the readout order and the job name respectively from each attributed print job 104a stored in the storage unit 104. The control unit 101 then generates a list data by arranging the job number, the readout order and the job name for the readout attributed print job 104a in order of the job numbers. The control unit 101 which has generated the list data outputs the list data to the display unit 105a and allows the display unit 105a to display each job name in order of the arrangement.

Further, the control unit 101 obtains the attribute ordered instruction signal from the operation unit 105b and reads out the job number, the readout order which is the content of the attribute information, and the job name respectively from each attributed print job 104a stored in the storage unit 104. The control unit 101 then generates the attribute ordered list data by arranging the job number, the readout order and the job name for the readout attributed print job 104a in a reverse readout order. The control unit 101 which has generated the attribute ordered list data outputs the attribute ordered list data to the display unit 105a and allows the display unit 105a to display each job name in the arrangement order.

FIG. 16 is a data content display diagram showing contents included respectively in the list data according to the present variation and in the attribute ordered list data.

A list data dt31 has a job number column D1 in which job numbers are stored, a readout order column D2 in which readout orders are stored, and a job name column D3 in which job names are stored.

The control unit 101 i) stores, into the job number column D1, the job numbers readout from the storage unit 104 by arranging in an ascending order from the top, ii) stores, into the readout order column D2, the readout orders which are the attribute information readout from the storage unit 104 by associating with the corresponding job numbers, and iii) stores, into the job name column D3, the job names readout from the storage unit 104 by associating with the corresponding job numbers.

An attribute ordered list data dt32 has, similar to the list data dt31, a job number column D4 in which job numbers are stored, a readout ordered column D5 in which readout orders are stored, and a job name column D6 in which job names are stored.

The control unit 101 arranges, for each attributed print job 104a readout from the storage unit 104, a set of the job number, a readout order which is attribute information, and a job name in a reverse readout order. The control unit 101 then stores, in the arrangement order, each job number into the job number column D4, each readout order into the readout column D5, and each job name into the job name column D6.

Accordingly, in the present variation, the job names of all print data 401 stored in the storage unit 104 are displayed to the display unit 105a not only by being arranged in an order set by default, but also by being arranged in a reverse order of the readout order in response to an operation by a user. Therefore, the user can easily find the print data 401 stored in the printer 300 by looking at the display unit 105a and allow the printer 300 to quickly execute printing based on the print data 401.

For example, when the user tries to execute printing based on the print data 401 whose job name is "BBB", if the screen shown in FIG. 6 is displayed to the display unit 105a and the "list data display" is selected, the list data dt31 shown in FIG. 16 is generated by the control unit 105a, and the job names are displayed, to the display unit 105a, in order of the job numbers. Therefore, the user cannot find the job name "BBB" unless pushing the arrow button btn2 of the operation unit 105b three times. However, if the user allows the screen shown in FIG. 6 to display to the display unit 105a and selects the "attribute ordered list data display", the attribute ordered list data dt32 shown in FIG. 16 is generated by the control unit 101 and the job names are displayed to the display unit 105a in a reverse order of the writing order. Therefore, the user can find the job name "BBB" without pushing the arrow button btn2 of the operation unit 105b even once. As the result, the printer 300 can quickly execute printing based on the print data 401.

Also, similar to what is explained in FIG. 10, the control unit 101 in the present variation displays, to the display unit 105a, the job names of the print data 401 stored in the storage unit 104 by limiting to the job names which correspond to the predetermined attribute information. That is, the control unit 101 according to the present variation allows the display unit 105a to display only the job names which correspond to the readout order inputted to the operation unit 105b from the user. Here, in the case where the readout order inputted to the operation unit 105b, for example, has a range from first to third and there is a plurality of job names corresponding to the orders, the control unit 101 displays the job names in a reverse order of the readout order.

Thus, also in the present variation, the job names of the print data 401 stored in the storage unit 104, according to an operation by a user, are displayed, to the display unit 105a, by limiting to the job names corresponding to the readout order designated by the user. Therefore, the user can more easily find a print data 401 stored in the printer 300 by looking at the display unit 105a and allows the printer 300 to quickly execute printing based on the print data 401.

(Variation 4)

Here, the variation 4 concerning the attribute information is explained.

The control unit 101 in the present variation determines an identifier for identifying the print data 401 of the print data 401 as an attribute.

That is, the control unit 101, in a process of generating the attribute information at Step S102 shown in FIG. 4, generates attribute information indicating the identifier by searching the identifier among the print data 401 instead of executing the procedure of generating the attribute information in the writing order shown in FIG. 5.

Figure 17:
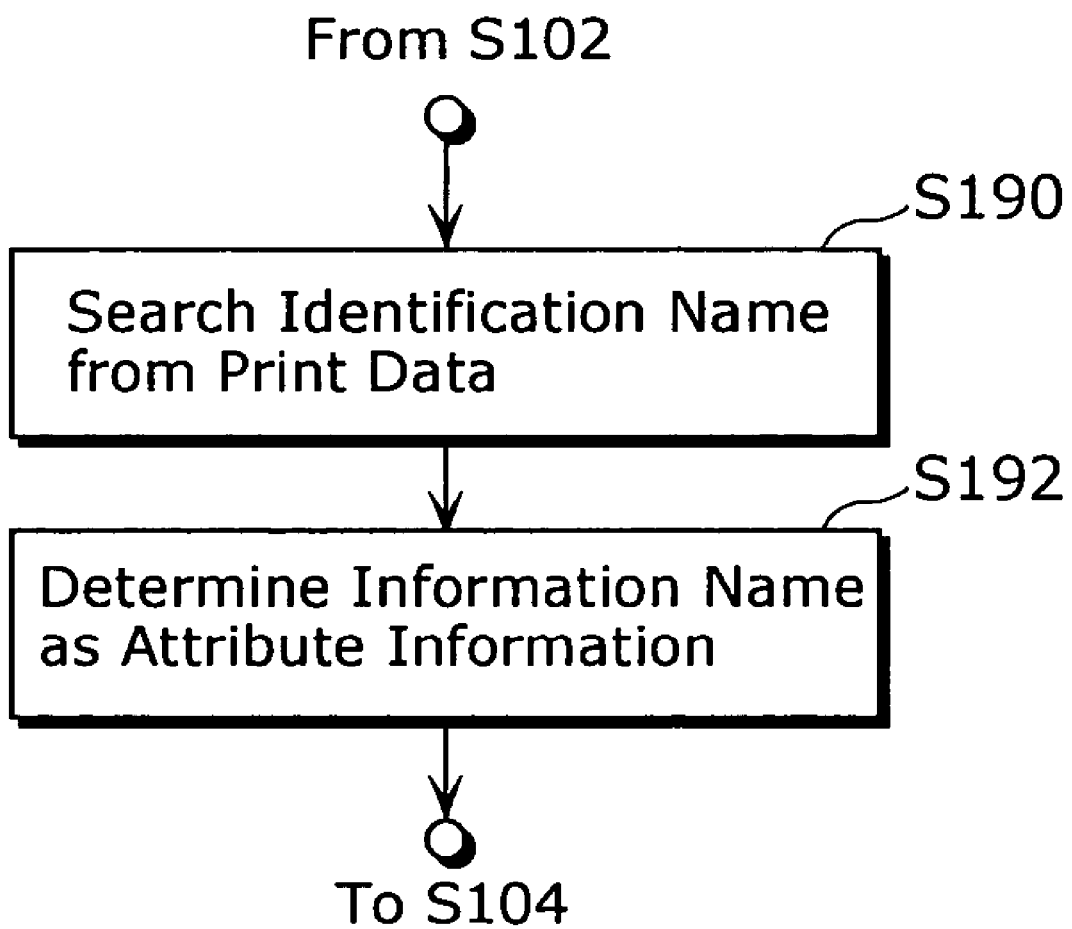
FIG. 17 is a flow chart indicating a detailed operation by the control unit 101 to generate attribute information indicating an identifier according to a variation 4 of the above mentioned.

FIG. 17 is a flowchart indicating a detailed operation by the control unit 101 for generating the attribute information indicating the identifier.

Firstly, the control unit 101 searches, for example, a name of a creator of the print data among the print data 401 as an identifier (Step S190). Here, the identifier to be searched can be the name of the print data 401, the date when the print data 401 is generated, the date when a printing is performed using the print data 401, a program name used for generating the print data 401 and the like.

The control unit 101 then reads out the identifier applied to the retrieval result and generates the attribute information indicating the identifier (Step S192).

By the way, when the creator's name is readout at Step S192, if the readout name is same as a name of a creator of the attribute information which has already written in the storage unit 104, the control unit 101 may process the readout creator's name to make it differ from the creator's name which has been written already and generate the attribute information indicating the processed creator's name.

Further, the control unit 101 in the present variation, according to a signal outputted from the operation unit 105b, allows the display unit 105a to display job names of each attributed print job 104a stored in the storage unit 104 in an ascending order of the job numbers or allows the display unit 105a to display job names of each attributed print job 104a in order of an alphabet of fifty phonetic sounds of the creator's names.

Specifically, the control unit 101 obtains the list display instruction signal from the operation unit 105b and reads out the job name, the creator's name indicated in the attribute information, and the job name respectively from each attributed print job 104a stored in the storage unit 104. The control unit 101 then generates list data by arranging the job number, the creator's name and the job name for the readout attributed print job 104a in a descending order of the job numbers. The control unit 101 which generated the list data outputs the list data to the display unit 105a and allows the display unit 105a to display each job name in the arrangement order.

Further, the control unit 101 obtains the attribute ordered instruction signal from the operation unit 105b and reads out the job name, the creator's name indicated in the attribute information, and the job name respectively from each attributed print job 104a stored in the storage unit 104. The control unit 101 then generates an attribute ordered list data by arranging the job number, the creator's name, and the job name for each readout attributed print job 104a in order of the alphabet of fifty phonetic sounds of the creators' names. The control unit 101 which has generated the attribute ordered list data outputs the attribute ordered list data to the display unit 105a and allows the display unit 105a to display each job name in the arrangement order.

Figure 18:
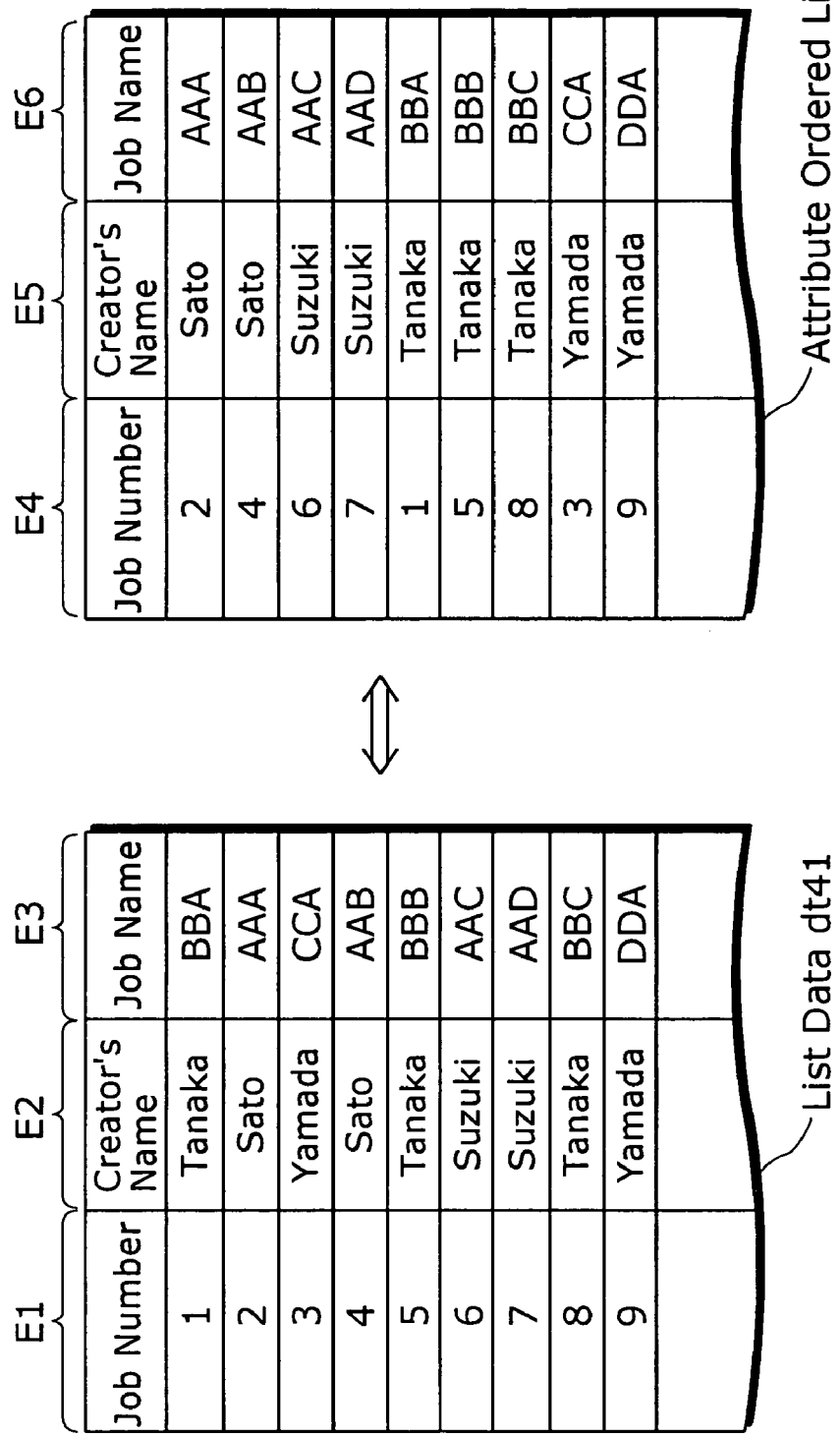
FIG. 18 is a data contents display diagram indicating contents included respectively in a list data and an attribute ordered list data according to the variation 4 of the above mentioned.

FIG. 18 is a data content display diagram showing contents included respectively in the list data and the attribute ordered list data according to the present variation.

A list data dt41 has a job number column E1 in which job numbers are stored, a creator's name column E2 in which creators' names are stored, and a job name column E3 in which job names are stored.

The control unit 101 stores i), into, the job number column E1 the job numbers readout from the storage unit 104 by arranging them in an ascending order from the top, ii) the names of the creators which are the attribute information readout from the storage unit 104 into the creator's name column E2 by associating with the corresponding job numbers, and iii) the job names readout from the storage unit 104 into the job name column E3 by associating with the corresponding job numbers.

The attribute ordered list data dt42, similar to the list data dt41, has a job number column E4 in which job numbers are stored, a creator's name column E5 in which creators' names are stored, and a job name column 6 in which job names are stored.

The control unit 101 arranges a set of the job number, the creator's name which is attribute information, and the job name for each attributed print job 104a read out from the storage unit 104 in order of the alphabet of fifty phonetic sounds of creators' names. The control unit then stores each job number into the job number column E4, each creator's name into the creator's name column E5 and each job name into the job name column E6 in the arrangement order.

Accordingly, in the present embodiment, the job names of all pieces of print data 401 stored in the storage unit 104 are displayed to the display unit 105a by being arranged not only in order set by default, but also in order of an alphabet of fifty phonetic sounds of creators' names. Therefore, the user can easily find the print data 401 stored in the printer 300 by looking at the display unit 105a and allows the printer 300 to quickly execute printing based on the print data 401.

For example, when a user tries to execute printing based on the print data 401 whose job name is "AAD", if the user allows the screen shown in FIG. 6 to display to the display unit 105a and selects the "list data display", the list data dt41 shown in FIG. 18 is generated by the control unit 101 and the job names are displayed to the display unit 105a in order of the job numbers. Therefore, the user cannot find the job name "AAD" unless pushing the arrow button btn2 of the operation unit 105b five times. However, if the user allows the screen shown in FIG. 6 to display to the display unit 105a and selects the "attribute ordered list data display", the attribute ordered list data dt42 shown in FIG. 18 is generated by the control unit 101 and the job names are displayed to the display unit 105a in order of an alphabet of fifty phonetic sounds of creators' names. Therefore, the user can find the job name by only pushing the arrow button btn2 of the operation unit 105b twice. As the result, the printer 300 can quickly execute the printing based on the print data 401 whose job name is "AAD".

Further, also in the present variation, the control unit 101, similar to what is explained in FIG. 10, allows the display unit 105a to display the job names of the print data 401 stored in the storage unit 104 by limiting to the job names which correspond to the predetermined attribute information. That is, the control unit 101 in the present variation allows the display unit 105a to display only job names which correspond to the creators' names inputted to the operation unit 105 by the user.

That is, when a menu button btn1 of the operation unit 105b is operated while the display unit 105a is displaying the list of the job names in order of the alphabet of fifty phonetic sounds of creators' names, the control unit 101, based on the signal outputted from the operation unit 105b, allows the display unit 105a to display a refine inquiry screen for inquiring whether or not refine the display of the attribute ordered list data dt42. Then, if the user inputs, to the operation unit 105b, an instruction to refine, the control unit 101 allows the display unit 105a to display only job names corresponding to the predetermined creators' names.

Figure 19:
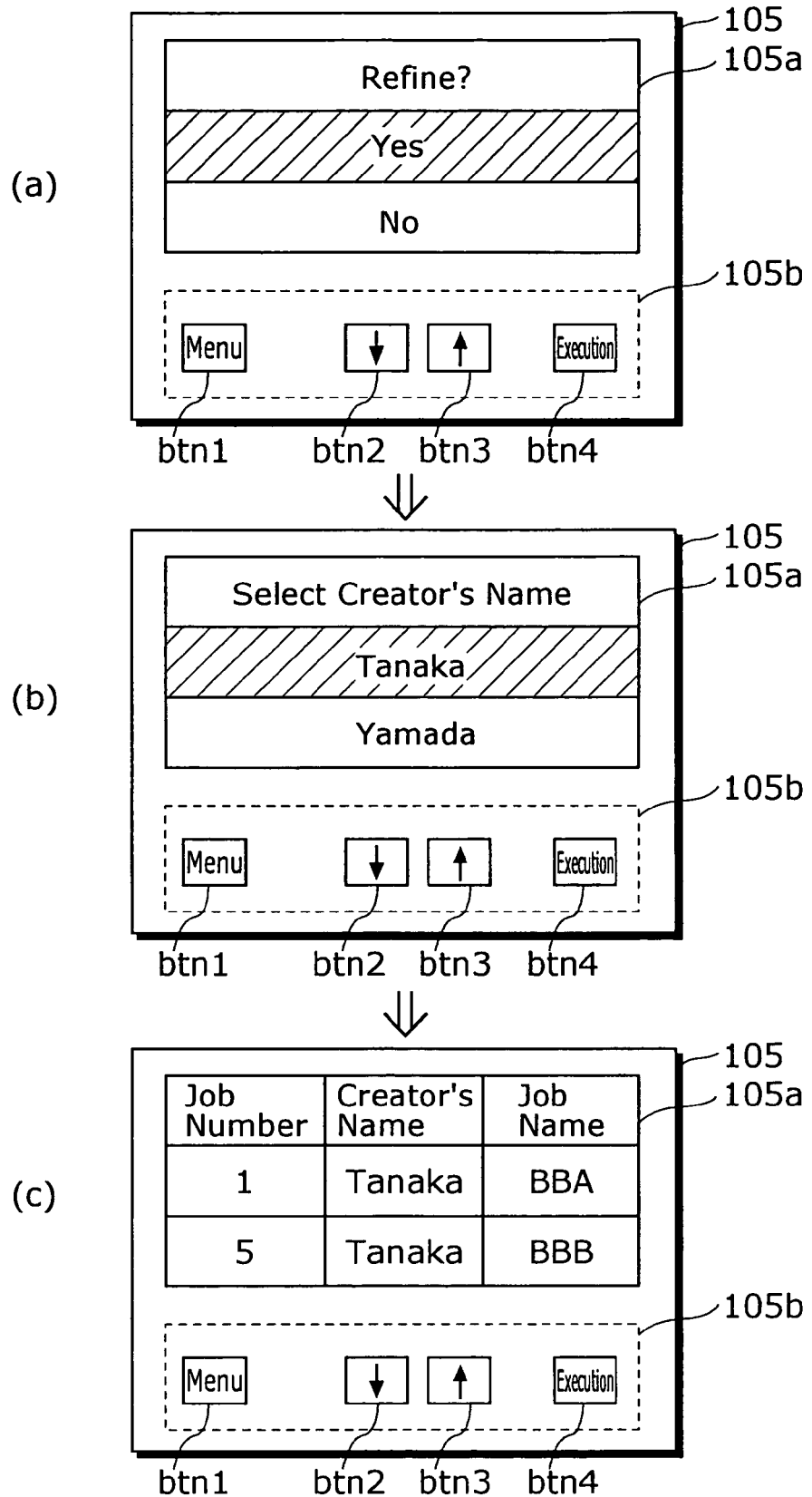
FIG. 19 is an illustration for explaining screen displays of a display unit when a refinement is performed according to the variation 4 of the above mentioned.

FIG. 19 is an illustration for explaining screen displays of the display unit 105a when the refinement according to the present variation is performed.

Firstly, the control unit 101, as shown in FIG. 19(*a*), allows the display unit 105a to display a refine inquiry screen for inquiring a user about whether or not refine the job names to be displayed. Here, the user operates the arrow buttons btn2 and btn3 of the operation unit 105b and "Yes" is reverse-displayed. When the execution button btn4 is operated, the control unit 101, as shown in FIG. 19(*b*), allows the display unit 105a to display a selection screen for selecting a creator's name. Here, when the user selects the name of the creator "Tanaka" by operating the operation unit 105b, the control unit 101, as shown in FIG. 19(*c*), allows the display unit 105a to display the job name which corresponds to the name of the creator "Tanaka". Here, when there is a plurality of job names which corresponds to a selected creator's name by the operation unit 105b, the control unit 101 displays the job names in an ascending order of the job numbers.

Thus, in the present variation, according to the operation by the user, the job names of the print data 401 stored in the storage unit 104 are displayed to the display unit 105a by limiting to the job names which correspond to the creators' names designated by the user. Therefore, the user can more easily find the print data 401 stored in the printer 300 by looking at the display unit 105a and allows the printer 300 to quickly execute printing based on the print data 401.

Here, in the present variation, the control unit 101 searches and specifies an identifier among the print data 401. However, the control unit 101 may specify the identifier based on a notice from the host computer 400. In this case, the host computer 400 i) displays an identifier input screen which urges a user to input the identifier before sending the print data 401, and ii) inputs information indicating an identifier and the print data 401 to the print control device 100 when the identifier is inputted on the identifier input screen. The control unit 101 of the print control device 100 obtains the information indicating the identifier via the I/F unit 106 and generates the attribute information indicating the identifier. Furthermore, in this case, a password of the user may be used as the identifier.

(Variation 5)

Here, the variation 5 concerning a display method of each job name is explained.

The display unit 105a according to the present variation displays, when the amount of characters of one job name is too many to display the whole in a display area, characters from the back of the character string included in the job name as much as the amount which can be fit in the display area.

Figure 20:
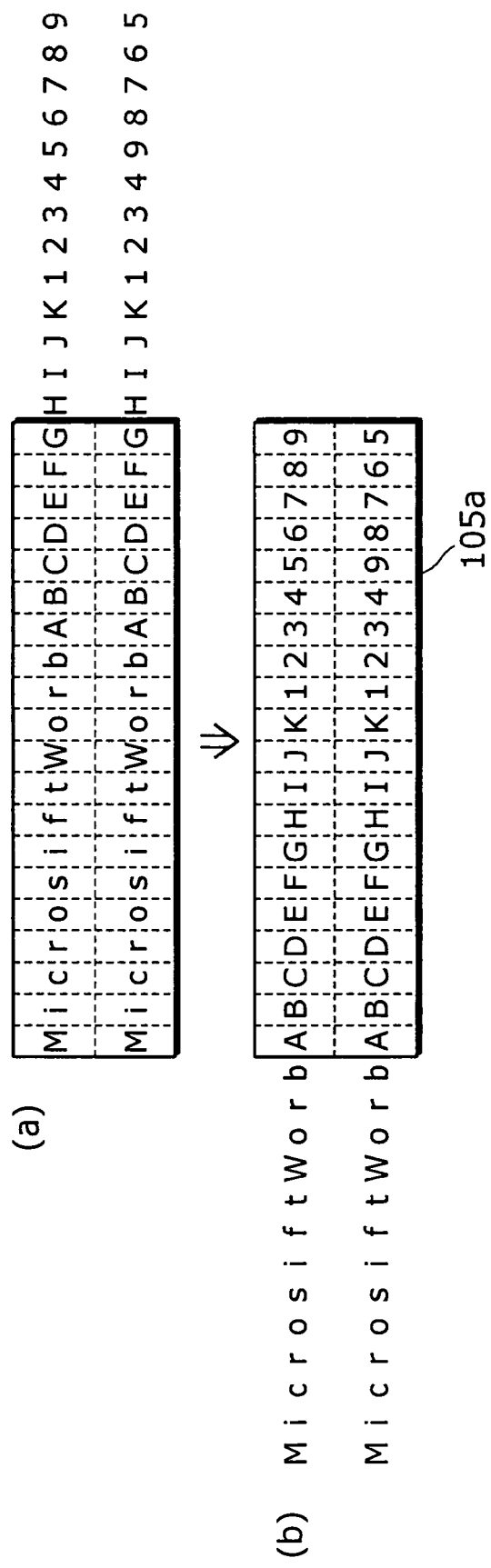
FIG. 20 is an illustration for explaining a display method for a display unit to display a job name according to a variation 5 of the above mentioned.

FIG. 20 is an illustration for explaining a display method for the display unit 105a in the present variation to display the job name.

In general, the job name of each print data 401 is likely to include common characters in the beginning of each job name, for example, an application name and the like, the user cannot distinguish each job name when only the characters in the beginning are displayed to the display unit 105a.

FIG. 20(a) is an example diagram showing an example which only characters in the beginning of the job name are displayed in the case where a space of 20 characters across is assigned to the display area in which the job name is shown (inside the solid frame in the diagram).

In such display area, if the front 20 characters respectively included the job name "MicrosiftWorbABCDEF-GHIJK123456789" and the job name "MicrosiftWorbABC-DEFGHIJK123498765" are displayed, both job names are displayed in same character strings ("MicrosiftWorbABC-DEFG") so that the user cannot distinguish each job name.

Consequently, the display unit 105b in the present variation displays the characters in the latter part of the job name as described above so that a user can distinguish each job name.

FIG. 20(b) is an example diagram showing an example that the display unit 105a displays latter part of characters of the job name according to the present variation.

As shown in FIG. 20(b), the display unit 105a displays the latter part of the characters of the job name in priority. Each job name is displayed respectively as "ABCDEF-GHIJK123456789" and "ABCDEFGHIJK123498765". As the result, the user can easily distinguish each job name.

Also, instead of displaying the latter characters of each job name as described above, an identification number is assigned to the top of each job name and allows the display unit 105a to display the identification number and the job name of the latter characters.

Figure 21:
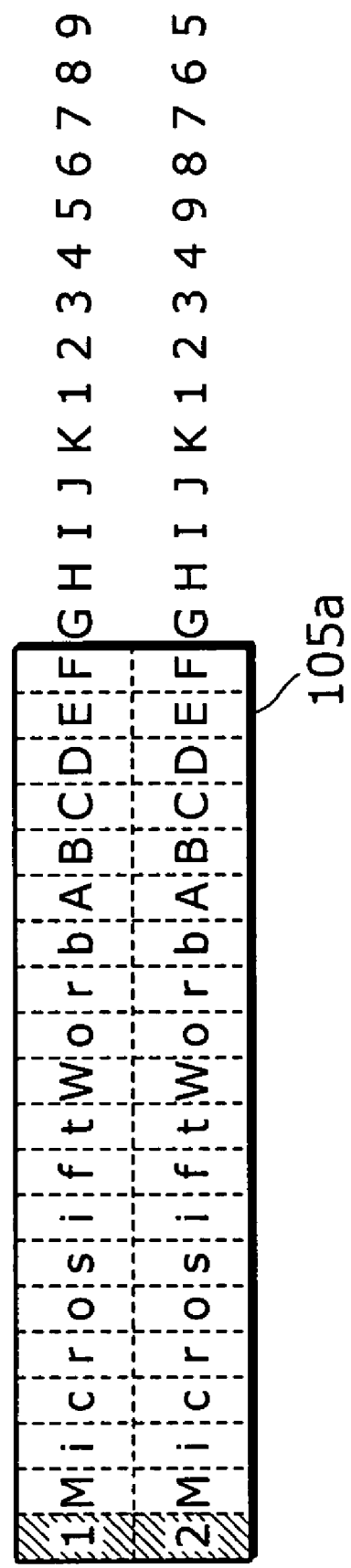
FIG. 21 is an example diagram showing an example that the display unit displays by assigning an identification number to a job name according to the variation 5 of the above mentioned.

FIG. 21 is an example diagram showing an example which the job name is displayed by assigning the identification number.

As shown in FIG. 21, the display unit 502a assigns identification number to each job name and displays "1Microsift-WorbABCDEF" and "2MicrosiftWorbABCDEF". Therefore, the user can easily distinguish each job name.

Thereof, the printer according to the present invention is explained using the present embodiment and its variations 1 to 4. However, the present invention does not limit to those examples.

For example, in the present embodiment and its variations 1 to 4, the control unit 101 assigns a job number which is a continuous number in sequence starting from 1 to each attributed print job 104a. However, job numbers which are not continuous but includes missing numbers may be assigned.

Also, in the present embodiment and its variations 1 to 4, the control unit 101 reads out the job name from the attributed print job 104a stored in the storage unit 104 and allows the display unit 105a to display the readout job name. However, unless it is the information that can identify the print data 401, the information may be readout from the attributed print job 104a and displayed to the displayed unit 105a.

Further, in the present embodiment and its variations 1 to 4, the control unit 101 generates the attributed print job 104a by adding single attribute information to single print data 401. However, the control unit 101 may generate the attributed print job 104a by adding various pieces of attribute information to one print data 401.

That is, the control unit 101 generates the attributed print job 104a by adding, to single print data 401, at least two of the first attribute information indicating the writing order, the second attribute information indicating the page numbers, the third attribute information indicating the readout times, the fourth attribute information indicating the readout order, and the fifth attribute information indicating the creator's name.

Then, the control unit 101, when it allows the display unit 105a to display the list of job names, i) inquires a user via the display unit 105a about in which order of the first to fifth attribute information in response to the attribute information to display the job name, ii) next generates the attribute ordered list data according to the attribute information in an order specified by the user and allows the display unit 105a to display the job name based on the data. Accordingly, the user can more easily find the desired print data 401 and execute printing based on the print data 401. Also, it can improve operability and usability of users.

Further, in the present embodiment and its variations 1 to 4, as an attribute shown in the attribute information, a writing order, the number of pages, the readout times, a readout order, and an identifier such as creator's name. It is needless to say that other contents may be the attributes.

Furthermore, the display unit 105 in the present embodiment and the variations 1 to 4 may have a function of displaying non-ASCII character such as Japanese by converting a nickname composed of the ASCII character. Consequently, the display unit 105a can display, even in the case where non-ASCII character cannot be displayed, the job name including the non-ACSII character such as Japanese by converting to an appropriate ASCII character.

Also, in the present embodiment and the variations 1 to 5, as for a memory print function, the print data 401 used for printing is stored in the storage unit 104 without deleting it in a format of the attributed print data 104a for later printing. However, the print data 401 which has not used for printing may be stored to use later for printing. In such case, the host computer 400 outputs, when transmitting the print data 401, together with the memory execution signal, a print reservation signal that instructs not to immediately execute the printing based on the print data 401.

The control unit 101 of the print control device 100 which obtains the print reservation signal only executes generating the attributed print data 104 and writing in the storage unit without immediately executing the printing based on the print data 401 obtained from the host computer 400.

INDUSTRIAL APPLICABILITY

The print control device according to the present invention makes a search of stored print data easy and is applicable to a printer having a memory print function and the like.

The invention claimed is:

1. A print control apparatus that performs print processing for printing by controlling a printer engine in a printer which prints data contents based on print data indicating the contents to be printed, comprising:
  a data generation unit operable to i) obtain the print data from outside the print control apparatus, and ii) generate print data with attributes by adding, to the print data, attribute information generated for the print data by the print control apparatus and indicating attributes of the print processing performed by the print control apparatus;
  a storage unit in which the print data with the attributes is stored;
  a writing unit operable to write, into the storage unit, the print data with the attributes generated by the data generation unit;
  an arrangement display unit operable to arrange and display, based on an operation by a user, print processing names included in the print data, each print processing name corresponding to one of a plurality of the print data with an attribute stored in the storage unit in an order according to the attribute information included in the plurality of print data with the attributes, each print processing name being a name included in and indicating the print data; and
  a print execution unit operable to i) allow one of the print processing names displayed on the arrangement display unit to be selected by the user, and ii) cause the printer engine to execute printing based on the print data of the print data with the attribute including the selected print processing name.

2. The print control apparatus according to claim 1, wherein the arrangement display unit displays the print processing name included in each print data corresponding to the one of the plurality of print data with the attribute to which the attribute information selected by the user belongs.

3. The print control apparatus according to claim 2, wherein the data generation unit adds, to the print data, an order in which the print control apparatus writes through the writing unit the generated print data with an attribute into the storage unit, as the attribute information.

4. The print control apparatus according to claim 1, wherein the data generation unit extracts, from the print data, information with which data other than the print data is recognized, as an identifier, and
  the data generation unit adds, to the print data, the identifier as the attribute information.

5. The print control apparatus according to claim 4, wherein the data generation unit i) extracts, as the identifier, information indicating a creator's name of the print data, and ii) uses the information indicating the creator's name as the attribute information.

6. The print control apparatus according to claim 5, wherein the arrangement display unit arranges and displays the print processing name included in the print data corresponding to the one of the plurality of print data in an order of fifty phonetic characters of the creator's name included, as the attribute information, in each of the plurality of print data with the attribute.

7. The print control apparatus according to claim 1, wherein the print control apparatus uses, and the attribute information, the number of pieces of paper required when the printer engine executes printing based on the print data, and
  the data generation unit adds the attribute information to the print data.

8. The print control apparatus according to claim 1, wherein the data generation unit adds, to the print data, information indicating the number of times a piece of print data is read out from the storage unit, as the attribute information, and the print control apparatus updates, when the print data is read out from the storage unit for the printing by the print execution unit, contents of the attribute information added to the print data to a value associated with the number of times the print data has been read out.

9. The print control apparatus according to claim 1, wherein the data generation unit adds, to each print data, information indicating an order in which the print data is read out from the storage unit, as the attribute information, and
  the print control apparatus updates, when the print data is read out from the storage unit for the printing by the print execution unit, contents of the attribute information added to the print data to a value associated with an order in which the print data is read out from the storage unit.

10. The print control apparatus according to claim 1, wherein the data generation unit adds, to the print data, and order in which the print control apparatus writes, through the writing unit, the generated print data with the attribute into the storage unit, as the attribute information.

11. The print control apparatus according to claim 1, wherein the arrangement display unit preferentially displays a character located in a latter part of a character string representing the print processing name.

12. A print control method for performing print processing for printing by controlling a printer engine in a printer which prints data contents based on print data indicating the contents to be printed, comprising:
  a data generation step of obtaining the print data, and generating print data with attributes by adding, to the print data, attribute information generated for the print data by a print control apparatus and indicating the attributes of the print processing performed by the print control apparatus;
  a writing step of writing, into a memory, the print data with the attributes generated in the data generation step;
  an arrangement display step of arranging and displaying, based on a operation by a user, print processing names included in each print data, each print processing name corresponding to one of a plurality of print data with an attribute stored in the memory in an order according to the attribute information included in the plurality of print data with the attributes, the print processing name being a name included in and indicating the print; and a print execution step of (i) allowing the selection of one of the print processing names displayed in the arrangement display step by a user and (ii) causing the printer engine to execute printing based on the print data of the print data with the attribute including the selected print processing name.

13. The print control method according to claim 12, wherein in the arrangement display step, the print processing name including in each print data corresponding to the one of the plurality of print data with the attribute to which the attribute information selected by the user belongs to displayed.

14. The print control method according to claim 13, wherein in the data generation step, an order in which the generated print data with the attribute generated is written into the memory in the writing step is added to the print data as the attribute information.

15. The print control method according to claim 12, wherein information with which print data other than the print data is recognized by the user is extracted from the print data an identifier, and
in the data generation step, the identifier is added to the print data as the attribute information.

16. The print control method according to claim 12, wherein in the data generation step, the number of pieces of paper required when the printer engine executes printing based on the printing data is used as the attribute information, and the attribute information is added to the print data.

17. The print control method according to claim 12, wherein in the data generation step, indicating the number of times a piece of print data is read out from the memory is added to the print data as the attribute information and, contents of the attribute information added to the print data is updated to a value associated with the number of times the print data has been read out when the print data is read out from the memory for the printing in the print execution step.

18. The print control method according to claim 12, wherein in the data generation step, information indicating an order in which the print data is read out from the memory is added to each print data as the attribute information, and
contents of the attribute information added to the print data are updated to a value associated with the order in which the print data is read out from the memory when the print data is read out from the memory for the printing in the print execution step.

19. The print control method according to claim 12, wherein in the data generation step, an order in which the print data with the attribute information is written into the memory in the writing step is added to the print data as the attribute information.

20. The print control method according to claim 12, wherein in the arrangement display step, a character located in a latter part of a character string representing the print processing name is preferentially displayed.

21. A computer program stored on a computer-readable medium for causing a computer to perform print processing for printing by controlling a printer engine in a printer which prints data contents based on print data indicating the contents to be printed, the computer program causing a computer to execute;
a data generation step of obtaining the print data, and generating print data with attributes by adding, to the print data, attribute information generated for the print data by a print control apparatus and indicating the attributes of the print processing performed by the print control apparatus;
a writing step of writing, into a memory, the print data with the attributes generated in the data generation step;
an arrangement display step of arranging and displaying, based on an operation by a user, print processing names included in each print data, each print processing name corresponding to one of a plurality of the print data with an attribute stored in the memory in an order according to attribute information included in the plurality of the print data with the attributes, the print processing name being a name included in and indicating the print data; and
a print execution step of (i) allowing the print processing names displayed in the arrangement display step to be selected by a user and (ii) causing the printer engine to execute printing based on the print data of the print data with the attribute including the selected print processing name.

22. The computer program according to claim 21, wherein in the arrangement display step, the print processing name included in each print data corresponding to the one of the plurality of print data with the attribute to which the attribute information selected by the user belongs is displayed.

23. The computer program according to claim 21, wherein in the data generation step, an order in which the generated print data with the attribute is written into the memory in the writing step, is added to the print data as the attribute information.

24. A printer comprising a printer engine which prints data contents based on print data indicating the contents to be printed and a print control apparatus which performs print processing for printing by controlling the printer engine,
wherein the print control apparatus includes;
a data generation unit operable to i) obtain the print data from outside the print control apparatus and ii) generate print data with attributes by adding, to the print data, attribute information generated for the print data by the print control apparatus and indicating the attributes of the print processing performed by the print control apparatus;
a storage unit in which the print data with the attributes is stored;
a writing unit operable to write, into the storage unit, the print data with the attributes generated by the data generation unit;
an arrangement display unit operable to arrange and display, based on an operation by a user, processing names included in each print data corresponding to one of a plurality of print data with an attribute stored in the storage unit in an order according to the attribute information included in the plurality of print data with the attributes, each print processing name being a name included in and indicating the print data; and
a print execution unit operable to i) allow a user to select one of the print processing names displayed on the arrangement display unit, and ii) cause the printer engine to execute printing based on the print data of the print data with the attribute including the selected print processing name.

25. The printer according to claim 24,
wherein the arrangement display unit displays the print processing name included in each print data corresponding to the one of the plurality of print data with the attribute to which the attribute information specified by the user belongs.

26. The printer according to claim 24,
wherein the data generation unit adds, to the print data, an order in which the print data with the attribute into the storage unit, as the attribute information.

* * * * *